United States Patent
Martin et al.

(10) Patent No.: US 8,380,932 B1
(45) Date of Patent: *Feb. 19, 2013

(54) CONTEXTUAL REGENERATION OF PAGES FOR WEB-BASED APPLICATIONS

(75) Inventors: John H. Martin, Austin, TX (US); Mark R. Scheevel, Austin, TX (US)

(73) Assignee: Open Text S.A., Luxembourg (LU)

( * ) Notice: Subject to any disclaimer, the term of this patent is extended or adjusted under 35 U.S.C. 154(b) by 627 days.

This patent is subject to a terminal disclaimer.

(21) Appl. No.: 12/212,414

(22) Filed: Sep. 17, 2008

Related U.S. Application Data

(63) Continuation-in-part of application No. 11/825,909, filed on Jul. 10, 2007, now Pat. No. 7,818,506, which is a continuation-in-part of application No. 10/733,742, filed on Dec. 11, 2003, now Pat. No. 7,360,025.

(60) Provisional application No. 60/433,408, filed on Dec. 13, 2002.

(51) Int. Cl.
*G06F 12/06* (2006.01)

(52) U.S. Cl. ............ 711/133; 711/141; 711/E12.021

(58) Field of Classification Search ............ 711/133, 711/118, 145, 146, 154, 141, E12.002, E12.001, 711/E12.021
See application file for complete search history.

(56) References Cited

U.S. PATENT DOCUMENTS

| | | | |
|---|---|---|---|
| 5,202,982 A | | 4/1993 | Gramlich et al. |
| 5,473,772 A | | 12/1995 | Halliwell et al. |
| 5,504,879 A | | 4/1996 | Eisenberg et al. |
| 5,740,430 A | | 4/1998 | Rosenberg et al. |
| 5,740,730 A | | 4/1998 | Rosenberg et al. |
| 5,946,697 A | | 8/1999 | Shen |
| 6,026,413 A | * | 2/2000 | Challenger et al. ......... 717/108 |
| 6,029,175 A | | 2/2000 | Chow et al. |
| 6,151,607 A | * | 11/2000 | Lomet .................................. 1/1 |
| 6,151,624 A | | 11/2000 | Teare et al. |
| 6,178,461 B1 | | 1/2001 | Chan et al. |
| 6,192,415 B1 | | 2/2001 | Haverstock et al. |
| 6,198,824 B1 | | 3/2001 | Shambroom |
| 6,272,492 B1 | | 8/2001 | Kay et al. |
| 6,408,360 B1 | | 6/2002 | Chamberlain et al. |
| 6,487,641 B1 | | 11/2002 | Cusson |
| 6,571,246 B1 | | 5/2003 | Anderson et al. |
| 6,591,266 B1 | | 7/2003 | Li et al. |
| 6,651,217 B1 | | 11/2003 | Kennedy et al. |
| 6,697,844 B1 | | 2/2004 | Chan et al. |
| 6,701,428 B1 | | 3/2004 | Harvey, III et al. |
| 6,725,333 B1 | * | 4/2004 | Degenaro et al. ............ 711/118 |
| 6,754,621 B1 | | 6/2004 | Cunningham et al. |
| 6,760,813 B1 | | 7/2004 | Wu |
| 6,772,203 B1 | | 8/2004 | Feiertag et al. |
| 6,785,769 B1 | | 8/2004 | Jacobs et al. |
| 6,850,941 B1 | | 2/2005 | White et al. |

(Continued)

OTHER PUBLICATIONS

Chen et al., "Wormhole Caching with HTTP PUSH Method for Satellite-Based Web Content Multicast and Replication System" Workshop 99, pp. 1-14, 1999.

(Continued)

*Primary Examiner* — Pierre-Michel Bataille
(74) *Attorney, Agent, or Firm* — Sprinkle IP Law Group

(57) ABSTRACT

Systems and methods for invalidating and regenerating pages. In one embodiment, a method can include detecting content changes in a content database including various objects. The method can include causing an invalidation generator to generate an invalidation based on the modification and communicating the invalidation to a dependency manager. A cache manager can be notified that pages in a cache might be invalidated based on the modification via a page invalidation notice. In some embodiments, the content change can affect a set of objects which can be defined by an attribute of the objects. The content change can be the creation or deletion of some object(s) in the content database. The cached page can be regenerated during which various dependencies of the regenerated page can be discovered.

20 Claims, 11 Drawing Sheets

U.S. PATENT DOCUMENTS

| | | | |
|---|---|---|---|
| 7,013,289 B2 | 3/2006 | Horn | |
| 7,024,452 B1 | 4/2006 | O'Connell et al. | |
| 7,096,418 B1 * | 8/2006 | Singhal et al. | 715/205 |
| 7,137,009 B1 | 11/2006 | Gordon et al. | |
| 7,188,216 B1 | 3/2007 | Rajkumar et al. | |
| 7,343,422 B2 | 3/2008 | Garcia-Luna-Aceves | |
| 7,360,025 B1 | 4/2008 | O'Connell et al. | |
| 7,398,304 B2 | 7/2008 | Smith et al. | |
| 7,752,394 B1 | 7/2010 | Rajkumar et al. | |
| 7,818,506 B1 | 10/2010 | Shepstone | |
| 7,899,991 B2 | 3/2011 | Rajkumar | |
| 8,041,893 B1 | 10/2011 | Fung | |
| 2001/0032254 A1 | 10/2001 | Hawkins | |
| 2001/0034771 A1 | 10/2001 | Hutsch et al. | |
| 2001/0037407 A1 | 11/2001 | Dragulev et al. | |
| 2002/0065912 A1 | 5/2002 | Catchpole et al. | |
| 2002/0165877 A1 | 11/2002 | Malcolm et al. | |
| 2002/0178187 A1 | 11/2002 | Rasmussen et al. | |
| 2002/0194219 A1 | 12/2002 | Bradley et al. | |
| 2003/0078964 A1 | 4/2003 | Parrella et al. | |
| 2003/0217117 A1 | 11/2003 | Dan et al. | |
| 2004/0030697 A1 | 2/2004 | Cochran et al. | |
| 2004/0030746 A1 | 2/2004 | Kavacheri et al. | |
| 2004/0107319 A1 | 6/2004 | D'Orto et al. | |
| 2004/0205165 A1 | 10/2004 | Melamed et al. | |
| 2004/0205452 A1 | 10/2004 | Fitzsimmons et al. | |
| 2006/0136472 A1 | 6/2006 | Jujjuri et al. | |
| 2006/0184572 A1 | 8/2006 | Meek | |
| 2010/0262785 A1 | 10/2010 | Rajkumar | |
| 2011/0035553 A1 | 2/2011 | Shepstone | |
| 2012/0011324 A1 | 1/2012 | Fung et al. | |

OTHER PUBLICATIONS

Fielding et al. "13 Caching in HTTP" part of Hypertext Transfer Protocol—HTTP/1.1, The Internet Society, 20 pgs, 1999.

Dias et al., "A Smart Internet Caching System" by University of Moratuwa, Sri Lanka, 13 pgs, 1996.

Office Action issued in U.S. Appl. No. 10/733,798, dated May 31, 2006, 14 pgs.

Office Action issued in U.S. Appl. No. 10/733,798, dated Jan. 3, 2006, 9 pgs.

Office Action issued in U.S. Appl. No. 10/733,742, dated Aug. 22, 2007, 14 pgs.

Office Action issued in U.S. Appl. No. 10/733,742, dated Feb. 7, 2007, 12 pgs.

Office Action issued in U.S. Appl. No. 10/733,742, dated Sep. 15, 2006, 8 pgs. .

Office Action issued in U.S. Appl. No. 10/733,742, dated Jun. 6, 2006, 15 pgs.

Office Action issued in U.S. Appl. No. 10/733,742, dated Jan. 17, 2006, 10 pgs.

Office Action issued in U.S. Appl. No. 11/701,193, dated Oct. 2, 2008, 9 pgs.

Notice of Allowance issued in U.S. Appl. No. 12/819,985 mailed Dec. 15, 2010, 10 pgs.

Office Action for U.S. Appl. No. 12/904,937, mailed Jan. 5, 2011, 12 pgs.

Office Action issued in U.S. Appl. No. 11/825,909 mailed Mar. 5, 2010,11 pgs.

Office Action issued in U.S. Appl. No. 11/701,193 dated Mar. 31, 2009, Rajkumar, 9 pages.

Office Action issued in U.S. Appl. No. 12/819,985 mailed Aug. 2, 2010, 9 pgs.

Office Action issued in U.S. Appl. No. 11/825,909 mailed Sep. 29, 2009, 9 pgs.

Office Action issued in U.S. Appl. No. 11/701,193, mailed Oct. 22, 2009, 10 pgs.

Office Action for U.S. Appl. No. 12/904,937, mailed Sep. 2, 2011, 13 pgs.

Office Action for U.S. Appl. No. 12/208,934, mailed May 10, 2011, 25 pgs.

Office Action for U.S. Appl. No. 12/904,937, mailed May 25, 2011, 11 pgs.

Notice of Allowance for U.S. Appl. No. 12/206,909, mailed Jul. 12, 2011, 27 pgs.

Office Action for U.S. Appl. No. 12/208,072, mailed Sep. 23, 2011, 10 pgs.

Office Action for U.S. Appl. No. 12/208,934 mailed Oct. 17, 2011, 11 pages.

Office Action for U.S. Appl. No. 12/904,937, mailed Dec. 1, 2011, 10 pgs.

Notice of Allowance for U.S. Appl. No. 13/237,236, mailed Mar. 9, 2012, 4 pgs.

Notice of Allowance for U.S. Appl. No. 12/208,072, mailed Feb. 27, 2012, 2 pgs.

Office Action for U.S. Appl. No. 12/208,934, mailed Mar. 27, 2012, 11 pgs.

Notice of Allowance for U.S. Appl. No. 12/904,937, mailed Apr. 24, 2012, 6 pages.

* cited by examiner

| ORIGINAL URL | CACHE DIRECTORY | PAGE I.D. | TTL | RE-GEN |
|---|---|---|---|---|
| http://www.vignette.com/ | QWERTY/UIOPPASR/ | ASDFGH | 5:00 | N |
| http://www.vignette.com/us/Solutions/Vignette+Web+Experience+Platform | QWERTY/UIOPPASR/ | YUIRTY | 7:45 | N |
| http://www.vignette.com/us/Events+%26+Webcasts | RXCVBN/NMJKLFGH/ | WDBHYK | 0:39 | N |
| http://www.vignette.com/us/Products/Web+Content+Management | STYUSF/UHRFVYIM/ | ERFTHY | 0:00 | Y |
| http://www.vignette.com/us/Services/Support1 | SZHJUY/DFGYHJJI/ | HJJKKY | 3:23 | Y |
| http://www.vignette.com/us/Services/Support2 | VJLKJL/RADHYIKV/ | XCFSRD | 6:21 | N |
| http://www.vignette.com/us/Customers/Customer+List | ZUIOOA/SFTDHSJS/ | MGVFTD | 8:12 | N |

*FIG. 12*

| PAGE IDENTIFIER | Object1 | Object2 | Object3 | ··· | Objectn-1 | Objectn |
|---|---|---|---|---|---|---|
| QWERTYUIOPPASRASDFGH | object 801 | | | ··· | | |
| QWERTYUIOPPASRASDFGH | object 802 | | | ··· | | |
| QWERTYUIOPPASRYUIRTY | object 801 | | | ··· | | |
| QWERTYUIOPPASRYUIRTY | object 804 | | | ··· | | |
| QWERTYUIOPPASRYUIRTY | object 810 | | | ··· | | |
| RXCVBNNMJKLFGHWDBHYK | object 801 | | | ··· | | |
| RXCVBNNMJKLFGHWDBHYK | object 803 | | | ··· | | |
| RXCVBNNMJKLFGHWDBHYK | object 805 | | | ··· | | |
| RXCVBNNMJKLFGHWDBHYK | object 807 | ABC | | ··· | | |
| STYUSFUHRFVYIMERFTHY | object 801 | DEF | | ··· | | |
| STYUSFUHRFVYIMERFTHY | object 806 | | | ··· | | |
| SZHJUYDFGYHJJIHJJKKY | object 801 | NEW TYPE A | | ··· | | |
| SZHJUYDFGYHJJIHJJKKY | object 808 | | | ··· | | |
| VJLKJLRADHYIKVXCFSRD | object 801 | NEW TYPE B | | ··· | | |
| VJLKJLRADHYIKVXCFSRD | object 809 | | | ··· | | |
| ZUIOOASFTDHSJSMGVFTD | object 801 | | | ··· | | |
| ZUIOOASFTDHSJSMGVFTD | object 802 | | | ··· | | |
| set 411 | object 802 | object 810 | | | | |
| set 412 | object 802 | object 803 | object 805 | ··· | object 806 | object 807 |
| QWERTYUIOPPASRASDFGH | set 811 | | | | | |
| QWERTYUIOPPASRYUIRTY | set 812 | | | | | |
| set 413 | set 811 | set 812 | object 808 | | | |

*FIG. 13*

CONTEXTUAL REGENERATION OF PAGES FOR WEB-BASED APPLICATIONS

CROSS REFERENCE TO RELATED APPLICATIONS

This application is a continuation in part of U.S. patent application Ser. No. 11/825,909, entitled "Method And System For Cache Management" by Lee Shepstone, Conleth O'Connell, Mark R. Scheevel, N. Isaac Rajkumar, Jamshid Afshar, Puhong You, Brett J. Larsen, and David Dean Caldwell, filed Jul. 10, 2007 (now U.S. Pat. No. 7,818,506); which is a continuation in part of U.S. patent application Ser. No. 10/733,742 (now U.S. Pat. No. 7,360,025), entitled "Method and System for Automatic Cache Management" by Conleth O'Connell, Mark R. Scheevel, and N. Isaac Rajkumar, filed Dec. 11, 2003; which claims the benefit of U.S. Provisional Patent Application No. 60/433,408, entitled "Extensible Framework for Caching and Configurable Caching Parameters" by N. Isaac Rajkumar, Conleth O'Connell, Jamshid Afshar, Puhong You, Brett J. Larsen and David Dean Caldwell, filed Dec. 13, 2002. This application is related to U.S. patent application Ser. No. 10/733,798 (now U.S. Pat. No. 7,188,216), entitled "Method and System for an Extensible Caching Framework" by N. Isaac Rajkumar, Puhong You, David Dean Caldwell, Brett J. Larsen, Jamshid Afshar and Conleth O'Connell; filed Dec. 11, 2003. This application is related to U.S. patent application Ser. No. 11/444,023, entitled "System And Method For The Dynamic Provisioning Of Static Content", by Rajkumar et al.; filed on May 31, 2006. This application is related to U.S. patent application Ser. No. 11/444,020, entitled "System And Method For The Provisioning Of Dynamically Generated Content," by Rajkumar et al. filed on May 31, 2006 (now U.S. Pat. No. 7,860,820). All applications cited within this paragraph are fully incorporated herein by reference.

TECHNICAL FIELD

Embodiments of the disclosure relate generally to managing page caches and more particularly to systems and methods of invalidating and regenerating cached pages based on invalidation events.

BACKGROUND

Communication of data over computer networks, particularly the Internet, has become an important, if not essential, way for many organizations and individuals to disseminate information. The Internet is a global network connecting millions of computers using a client-server architecture in which any computer connected to the Internet can potentially receive data from and send data to any other computer connected to the Internet. The Internet provides a variety of methods by which to communicate data, one of the most ubiquitous of which is the World Wide Web. Other methods for communicating data over the Internet include e-mail, usenet newsgroups, telnet and FTP.

The World Wide Web is a system of Internet servers, typically called "web servers", that support the documents and applications present on the World Wide Web. Documents, known as web pages, may be transferred across the Internet according to the Hypertext Transfer Protocol ("HTTP") while applications may be run by a Java virtual machine present in an internet browser. Web pages are often organized into web sites that represent a site or location on the world wide web. The web pages within a web site can link to one or more web pages, files, or applications at the same web site or at other web sites. A user can access web pages using a browser program and can "click on" links in the web pages being viewed to access other web pages.

Each time the user clicks on a link (or types an address into a browser program), the browser program generates a request and communicates it to a web server hosting web pages or applications associated with the web site. The web server retrieves the requested web page or application from an application server or Java server and returns it to the browser program. Web pages and applications can provide a variety of content, including text, graphics, interactive gaming and audio and video content.

Because web pages and associated applications can display content and receive information from users, web sites have become popular for enabling commercial transactions. As web sites become more important to commerce, businesses are increasingly interested in quickly providing responses to user's requests. One way of accelerating responses to requests on a web site is to cache the web pages or applications delivered to the requesting user in order to allow faster access time to this content when it is next requested.

Current caching methods, however, typically provide very limited functionality. This functionality may be particularly limited when it comes to dealing with changes in content. When an identical request is presented content may be served from the cache, even though this content may have been updated at the application server in the intervening time span; or content responsive to the request must once again be generated and cached, delaying the response to the request.

With the proliferation of information on the Internet, it is becoming increasingly difficult to prepare and deliver content to end users in an efficient and timely manner. Current content delivery systems employ various content publishing techniques. Typically, most web sites are produced by in-sequence publishing actions. For example, a set of web pages can be generated by an application server and made available to a web server for appropriate actions. In other words, to implement a web site, a set of web pages may be produced at an application layer and published at a presentation layer.

In response to an end user request, the web server may serve one or more web pages to the end user. As repeatedly serving frequently requested web pages can consume resources, dynamically generated web pages can be cached to quickly service user requests and conserve processing and network resources. Thus, when an end user elects to "refresh" previously delivered content (e.g., by clicking a "Refresh" button on a browser application's menu), the same content may be retrieved from a cache and again delivered to that end user.

All of the web pages implementing a web site can be updated as needed or reproduced at some regular interval to incorporate changes in the content. However, in conventional content delivery systems, all of the web pages implementing the web site may have to be reproduced. Moreover, changes made to the content may only be taken into account at the intervals at which the web pages are reproduced. Thus, web pages delivered to an end user may, for a period of time, contain stale content. In addition, reproducing web pages for each and every web site affected by certain changes may require a long period of time.

Another content publishing technique involves portal applications or standard Java® service or Server Page (JSP) applications. These applications typically have dynamic scripting capability that can work in tandem with hypertext markup language (HTML) code to separate the logic of a page from its static elements (e.g., the actual design layout and display of the page). The extracted portion of the page can then be used to make dynamic database queries and assemble pages on-the-fly accordingly. However, the logic and the content underlying the pages assembled on-the-fly can be modified after the pages are delivered, thereby allowing stale content to remain in circulation.

SUMMARY OF THE DISCLOSURE

Embodiments of the present disclosure provide systems and methods for regenerating cached pages that eliminate, or at least substantially reduce, the shortcomings of previously available systems and methods for regenerating cached pages.

Systems and methods for invalidating and regenerating pages are provided by various embodiments. In one embodiment, a method can include detecting content changes in a content database including various objects. The method can include causing an invalidation generator to generate an invalidation event based on the modification to a set of one or more content objects and communicating the invalidation event to a dependency manager. A cache manager can be notified that one or more pages in a cache might be invalidated based on the invalidation event.

In one embodiment, a method can include receiving a page invalidation notice and sending a page regeneration request to a page generator. The method can include regenerating the cached page. The method can include forwarding the regenerated page to the cache manager and replacing the cached page with the regenerated page.

In one embodiment, a method can include invalidating a cached page based on a content modification and regenerating pages which might depend on the modified content. In some embodiments, the method can include determining whether a cached page which can be dependent on various sets of objects and can be stored in the page cache is affected by the modification of the set of one or more objects stored in the content database. The dependencies between the cached page and the set of objects can be stored in a dependency database accessible by the dependency manager. In some embodiments, the dependencies can be discovered during regeneration of the cached page. The dependencies can include a reference to the cached page and a reference to a set of object in some embodiments.

One embodiment disclosed herein may provide a computer readable storage medium storing instructions for implementing methods of invalidating and regenerating cached pages as described above. One embodiment of a system for regenerating a cached page may comprise a processor and a computer readable storage medium accessible by the processor and storing instructions executable by the processor to perform methods of invalidating and regenerating cached pages as described above.

Embodiments disclosed herein can provide many advantages. For example, regenerating cached pages can reduce the amount of stale data in the cache. When stale data happens to be in the cache, embodiments disclosed herein can reduce the time during which such stale data resides in the cache. Furthermore, overlapping invalidation events may allow invalidated pages to remain in the cache. Embodiments disclosed herein can detect overlapping modifications and can avoid caching pages which may have become stale while being regenerated. In embodiments disclosed herein, pages can be invalidated based on events. In some embodiments, invalidated pages can be regenerated. In some embodiments, invalidated pages can be discarded. By reducing the amount of stale data in the cache, embodiments disclosed herein can facilitate the fast and efficient delivery of correct and timely content.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions, or rearrangements may be made within the scope of the disclosure, and the disclosure includes all such substitutions, modifications, additions, or rearrangements.

BRIEF DESCRIPTION OF THE DRAWINGS

A more complete understanding of the disclosure and the advantages thereof may be acquired by referring to the following disclosure, taken in conjunction with the accompanying drawings in which like reference numbers generally indicate like features.

FIG. 12 illustrates one embodiment of a cache control table.

FIG. 13 illustrates one embodiment of page dependencies.

DETAILED DESCRIPTION

Figure 1:
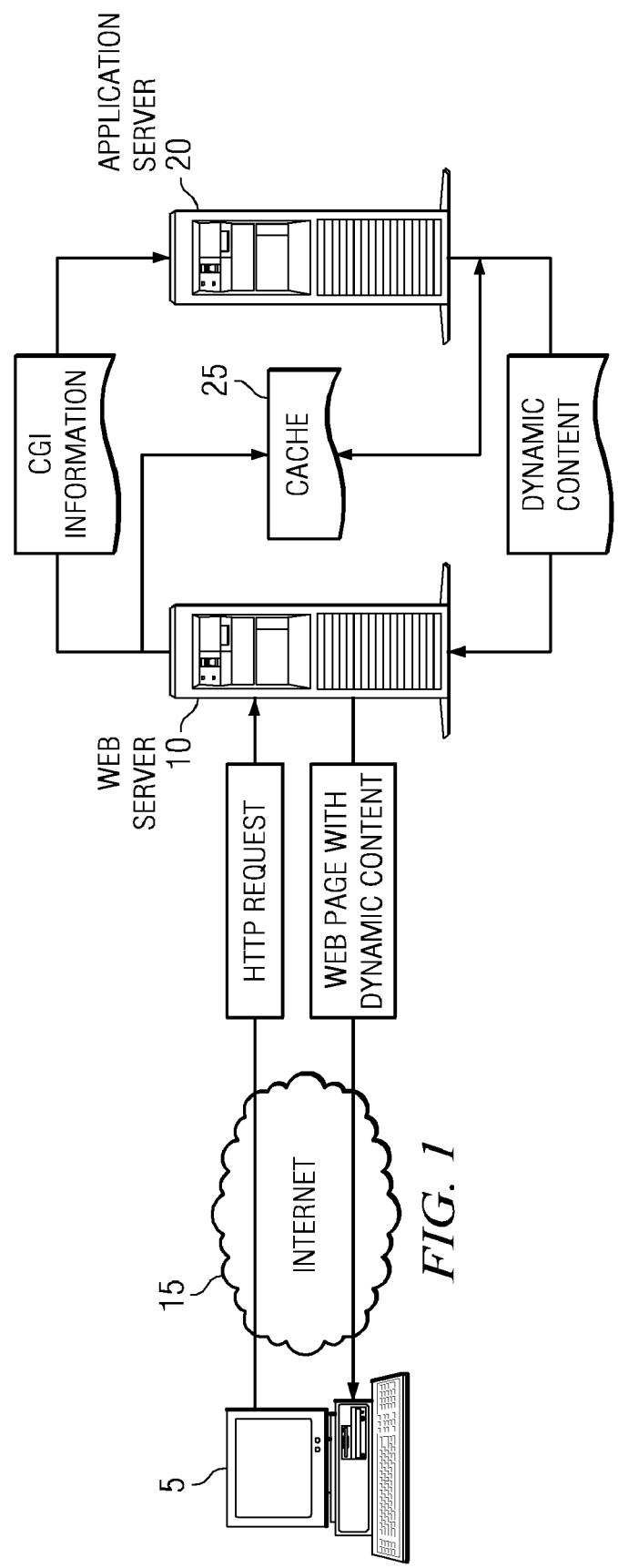
FIG. 1 is a diagrammatic representation of one embodiment of a system of caching content at a web site.

Various embodiments of the disclosure are illustrated in the FIGURES, like numerals being generally used to refer to like and corresponding parts of the various drawings. Embodiments of the disclosure provide systems and methods for regenerating cached pages.

Before discussing specific embodiments, an embodiment of a hardware architecture for implementing certain embodiments is described herein. One embodiment can include a computer communicatively coupled to a network (the Internet in some embodiments). As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

The functionalities and processes described herein can be implemented in suitable computer-executable instructions. The computer-executable instructions may be stored as software code components or modules on one or more computer readable storage media (such as non-volatile memories, volatile memories, DASD arrays, magnetic tapes, floppy diskettes, hard drives, optical storage devices, etc. or any other appropriate computer-readable storage medium or data storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An internet Service Provider ("ISP") is a common type of network access provider.

Within this disclosure, term "portal" generally refers to a gateway that is or can be a starting site, a home site, or an anchor site for networked end users visiting the World Wide Web (WWW or web). Examples of portals include www.yahoo.com, www.cnet.com, www.microsoft.com, and www.aol.com. A portal is a kind of web site with a rich navigation structure of internal links within the same site and external links to other sites. In some cases, a company may provide one or more portals connecting the company's intranet to the web. Currently, most portals adopt a style of categorizing content with a text-intensive, fast loading web page. Services provided by portals or portal sites typically include a directory of web sites or links, a search facility to search for other sites, news, weather, email, stock quotes, maps, and so on.

A portal site may comprise portlets or portal pages through which a plurality of channels and sub-channels of content can be presented to end users. Large scale portal sites capable of handling a high volume of content are typically built with a few "page templates" that can be reused to display content. For example, in response to an end user request, a portal page may be assembled on-the-fly based on a page template. In this manner, content displayed on the portal site can remain relatively up-to-date and not all pages of the portal site must be reproduced to limit the overall amount of stale content in the portal site.

Web sites and portal sites, particularly large scale portal sites, are generally produced and managed at the server side, transparent to end users. While content delivery systems employing JSP or portal applications offer many advantages, there is no automated process to coordinate update activities in the backend. For example, update activities made by, and at, a content management system may not be automatically propagated to a content delivery system. This may result in stale content remaining in caches in the content delivery system. Therefore, there is a need for new systems and methods for regenerating cached pages.

Within this discussion, the term "complex record" refers to a single logical entity that may comprise more than one row in more than one table within a database. The term "software component" refers to at least a portion of a computer program (i.e., a software application). Examples include a content delivery software component, a content management software component, or the like. Different software components may reside in the same computer program or in different computer programs on the same computer or different computers.

Before discussing embodiments, an exemplary hardware architecture for use in conjunction with embodiments is described. While the it may useful to an understanding of embodiments to describe embodiments in conjunction with such an exemplary architecture it will be understood that embodiments may also be implemented in conjunction with a wide variety of other architectures. In FIG. 1, a user on client computer 5, through an Internet browser, makes a request (using HTTP for example) for content to a web server 10 over the Internet 15 (or other network). Content may be an application or data provided by a web site such as an HTML page, Java application or the like.

For example, if the requested web page includes dynamic content, the web server 10 may initiate a script, using, for example, the common gateway interface ("CGI") mechanism, to send data (e.g. a request or portions thereof) to an application server 20 to generate the dynamic content. Application server 20 can generate dynamic HTML (or other types of) content according to a programming language such as Java, C or PERL and return the contents to web server 10.

Web server 10 can, in turn, communicate the content back to the client computer as the requested web page.

Figure 2:
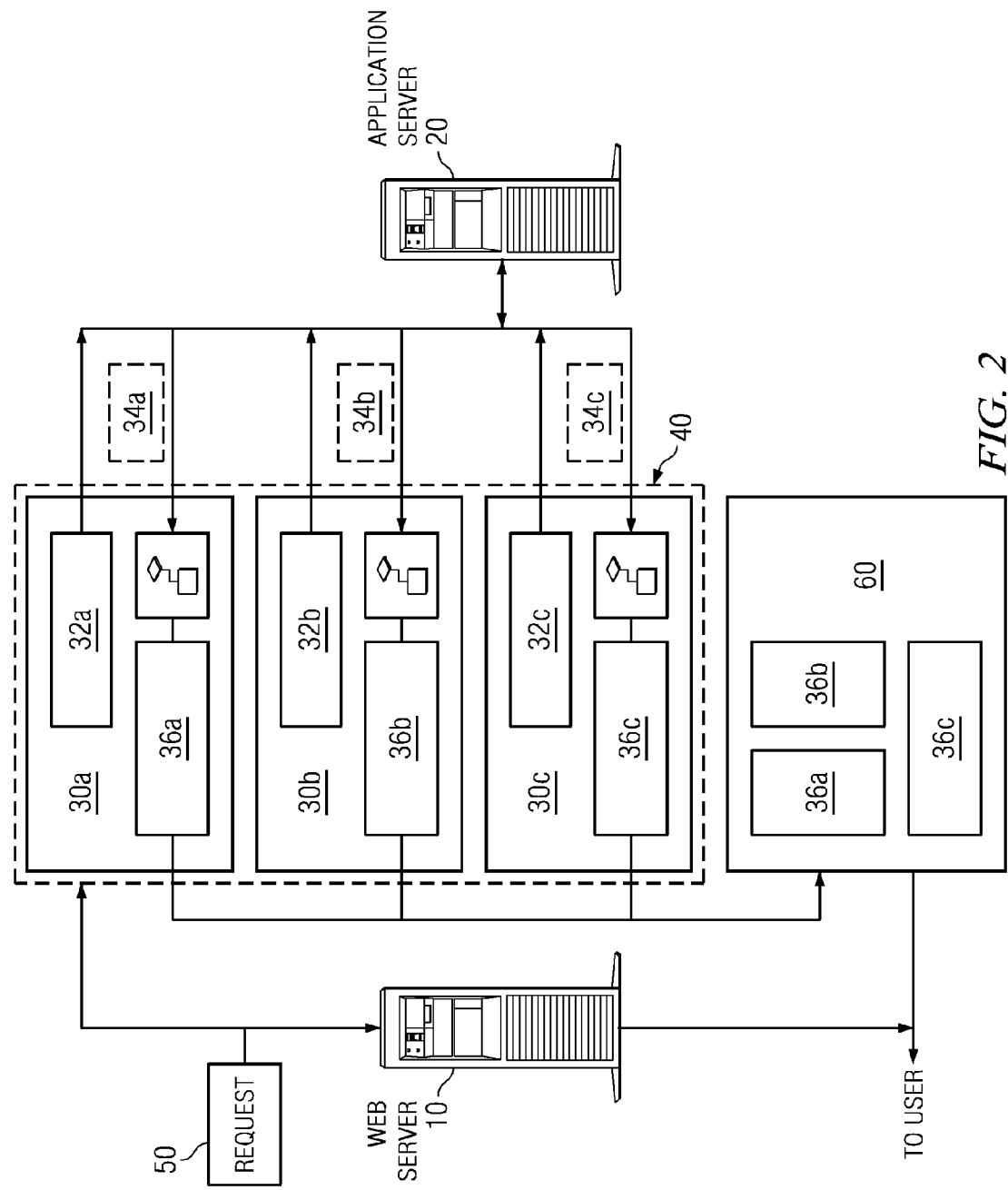
FIG. 2 is a diagrammatic representation of one embodiment of assembling content.

In some cases, content may be assembled from other content chosen based on a request initiated by a user of a site. This may be better explained with reference to FIG. 2 which depicts one example of the assembly of content responsive to a request. Based on an incoming request 50 a content template 40 corresponding to a page or other content may be obtained (e.g. located in memory or storage by web server 10 or application server 20 using at least a portion of the request 50). This template 40 may be associated with one or more components 30, where each of these components 30 is operable to generate content to be included in assembled content according to the template 40 and responsive to request 50. Each of these components 30, in turn, may be associated with one or more rules 32. Each of these rules 32 may be used to obtain or identify content 34 (e.g. from application server 20 or another source such as a data store associated with application server 20) based on a set of sensitivities, for example a format of content (e.g. articles, graphics, etc.), type of content (news, etc.), a category of content (e.g. sports, entertainment, etc.) timing of content (e.g. most recent, within the last day, hour, week, etc.), etc. The content 34 obtained utilizing rules 32 associated with a particular component 30 may then be processed by that component 30 to generate content 36 for that component 30 (for example, formatting the content, extracting portions of the content, generating HTML, WML or XML based on the content, etc.), and the content 36 generated for each of those components 30 assembled to formulate content 60 responsive to the request 50 which may then be sent to the user who initiated the request 50 (it will be understood that content responsive to the request may include other or additional content to that generated by components 30).

Returning to FIG. 1, before or during the assembly of content responsive to a request, web server 10 may check to see if content associated with the request (e.g. content which was generated by a component and used to assemble a response to the request) is stored in cache 25, and if so, web server 10 can communicate this content back to the user on client computer 5 (e.g. use the cached content to assemble a response to the request), otherwise web server may pass on the request or portions thereof to application server 20 as described above such that the appropriate content may be generated. For example, referring briefly again to FIG. 2, template 40 is being used to assemble content responsive to request 50. In this case, web sever 10 may check cache 25 to determine if content 36a, 36b, 36c generated by component 30a, 30b or 30c is present in cache 25. If content 36a, 36b or 36c is present in cache 25 this cached content 36a, 36b or 36c may be used to assemble content 60 in response to the request, while if content corresponding to a component is not present the corresponding component 30a, 30b, 30c may be used to generate the content. By caching content delivered from application server 20, this cached content may subsequently be used to assemble content in response to a request such that the responsive content (e.g. content assembled in response to a request) may be delivered to client computer 5.

Caching content in cache 25 may, however, be somewhat problematic. More particularly, content may be added (e.g. to a data store associated with application server 20), where this content may be pertinent, or otherwise related, to content in cache 25. For example, suppose content responsive to a user request includes content generated by a component operable to generate content comprising headlines corresponding to the five most recent news articles (e.g. in a data store). Suppose further that in response to the user request this content is generated by the component using the five most recent news articles and stored in cache 25.

Now suppose that a news article is added (e.g. to the data store). Here, the content stored in cache 25 has been rendered stale by virtue of the newly added article. In other words, if the component which originally generated the content were now invoked the content generated would be different than the cached content (e.g. it would include the headline from the newly added news article). Thus, any subsequent responses to user requests which utilize the previously cached content (e.g. requests which reference a template associated with the component which generated the cached content) may comprise the stale cached content until such a point as the cached content is flushed or regenerated.

Similarly, cached content within cache 25 may also be rendered stale through changes to content already present when the cached content was generated. Continuing with the above example, suppose content responsive to a user request includes content generated by a component operable to generate content comprising headlines corresponding to the five most recent news articles (e.g. in a data store). Suppose further that in response to the user request this content is generated by the component using the five most recent news articles and stored in cache 25. Now suppose that the headline of one of the five most recent news article is altered. Here, the content stored in cache 25 has been rendered stale by virtue of the altered article. Again, if the component which originally generated the content were now invoked the content generated would be different than the previously cached content (e.g. it would include the headline corresponding to the altered news article).

As can be seen from the above examples, there may be a period of time where stale content may be served to a user from the cache. As it is desired to communicate current information or content to users, it may be desirable to substantially minimize or otherwise reduce this time period.

To that end among others, attention is now directed to systems and methods for managing cached content. More particularly, embodiments may allow cached content to be updated (e.g. regenerated or replaced) based on newly added or changed content. Specifically, embodiments may allow cached content to be regenerated, replaced or updated based on newly added, or changed, content associated with the cached content such that cached content is updated substantially immediately when pertinent new content is added or content from which the cached content was generated is altered. By updating the cached content substantially immediately following an addition or alteration of content at least a twofold benefit may be achieved in the performance of a caching system or an associated site. Namely, the benefits of caching (e.g. speed) may be realized in addition to the benefits of serving substantially current content from the cache.

Embodiments of these systems and methods may facilitate the updating of cached content by associating metadata with cached content. In particular, this metadata may include a set of rule sensitivities associated with the generation of the cached content. These rule sensitivities, in turn, may allow a cache manager to dynamically update this cached content based upon conditions other than a request for similar content, including the addition of new content associated with the cached content or alterations or updates to content used to generate the cached content. In particular, these rule sensitivities may be used to locate or otherwise identify cached content pertinent to newly added content such that the cached content may be updated.

Furthermore, in some embodiments, the updating of located or identified cached content may be accomplished using the metadata stored in association with the cached content where the metadata includes metadata associated with the generation of the cached content. Embodiments of these systems and methods may facilitate the storing of metadata associated with cached content by using a generalized extensible architecture that allows evaluation of the parameters associated with the generation of the cached content such as sensitivities associated with a component or a wide variety of other parameters including those associated with cookies, form data, session data, request, browser capabilities, etc.

This metadata may comprise almost any data obtained in conjunction with the generation of the cached content, including rule sensitivities or content identifiers as discussed above. Additionally, the metadata may include request metadata obtained in conjunction with the request itself. This request metadata may pertain to the assembly of content which interests the user, and may consist of data pertaining to the individual aspects and parameters of the request, including parameters associated with a template which may be used to generate content responsive to the request. For example, the request may contain a Universal Resource Locator (URL), originating locale, a query string, or perhaps a user-agent string indicating the type of browser initiating the request. This metadata may be used by a cache manger to regenerate an original request in order to refresh the content residing in cache.

Metadata may also be obtained from the template used to assemble content responsive to a request. This template metadata may contain information on aspects of a request to which a particular piece of content may be sensitive, and whether a particular piece of content should be cached.

In one embodiment, a cache manager may be registered with an application manager which informs the cache manager when content has been updated or new content has been added. Based upon this notification and metadata associated with the cached content, the cache manager may identify cached content pertaining to the new or updated content. Using the metadata stored in association with the identified cached content a cache manager may regenerate a request associated with the cached content such that the cached content may be updated. Updating the cache may be done in the background without receiving a new request from a user, allowing content in the cache to be kept current and drastically improving the performance and response time of a web site.

This application manager may, in turn, be part of or in communication with a content deployment agent coupled to a content management system. The deployment agent may receive updated content, and the application manager may take notice when content has been updated or added in conjunction with the deployment agent. The application manager may also be responsible for the assembly of content to be delivered by an application server in response to a request from a user.

An extensible caching framework may be present on web server 10 to evaluate incoming requests or locate cached content responsive to the incoming request based on the parameters contained in the request. In particular, this extensible caching framework may provide one or more component sensitivities to be stored in conjunction with cached content such that cached content pertaining to newly added or altered content may be identified. This extensible caching framework may also formulate a signature to be utilized in retrieving this content from cache when a request for the same content is received by web server 10 and provides metadata to be stored in conjunction with the content in order to facilitate regeneration of the request which originally resulted in delivery or generation of the cached content.

Figure 3:
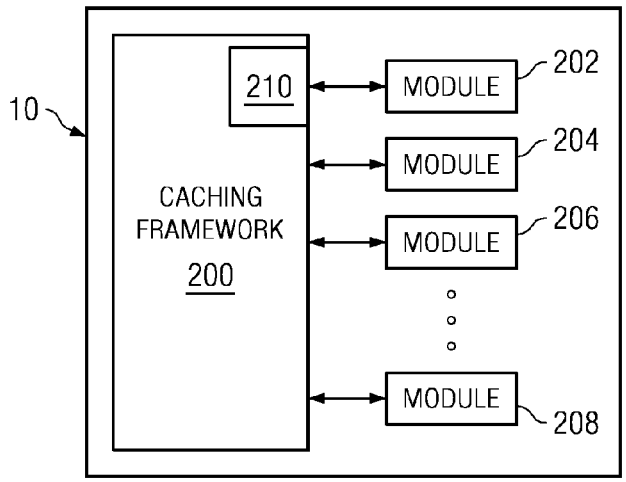
FIG. 3 is a diagrammatic representation of one embodiment of a system for an extensible caching framework.

Moving now to FIG. 3, an architectural diagram of an embodiment of an extensible caching framework is depicted. Extensible caching framework 200 may reside on web server 10 and use modules 202, 204, 206, 208 to evaluate parameters of an incoming request. Each of these modules 202, 204, 206, 208 may be responsible for a particular parameter associated with an incoming request. In many embodiments, the operators of a website can dictate specific parameters of an incoming request they wish to be evaluated by registering a custom module 208 with the framework. In this manner, the architecture 200 is made extensible by allowing the operators to add and remove modules 202, 204, 206, 208 relating to a wide variety of parameters of incoming requests.

When a module 202, 204, 206, 208 is registered with the framework, the module 202, 204, 206, 208 may initialize and pass to the framework a set of configuration variables, these configuration variables may include interface method 210 to be used between the framework and module 202. More specifically, this may include variables of an incoming request to be passed by framework 200 to module 202, the template metadata of the content requested and desired by module 202, and the format in which information is to be returned by module 202 to framework 200. This registration data may also include registering configuration variables used by the module 202, and specific routines used by the module 202 for request mapping. During operation of framework 200, when web server 10 receives a request, modules 202, 204, 206, 208 executing on web server 10 may each evaluate portions of the incoming request with respect to the parameter to which the module 202, 204, 206, 208 pertains and pass their respective evaluations to framework 200. These evaluations may include metadata regarding a parameter of a request, whether module 202, 204, 206, 208 believes the request should be served from cache 25 or passed along to application server 20, or a string value which may be used for locating responsive content in cache 25, for caching any content generated from application server 20 based on the request, or for assembling a signature to be associated with any content generated from application server 20.

Examples of caching parameters that may be evaluated by these modules include query string variables in the request, cookies in the request, the HTTP header in the request, form variables in the HTTP POST request, locale detected from the request, or a custom defined parameter. It will be readily apparent to those of ordinary skill in the art that a wide variety of parameters may be identified in requests and utilized in the caching of various pieces of content. Additionally, it will be apparent that because of the variety of these parameters the implementation of each module 202, 204, 206, 208 may vary greatly, and that the important concept is that modules may be added and removed from framework 200, and framework 200 will continue to utilize a set of available modules 202, 204, 206, 208 in the evaluation of incoming requests and the caching of the corresponding generated content.

The evaluation of these individual parameters allows content delivered in response to a request to be tailored more accurately to the specifics of an incoming request. For example, in some cases there may be many versions of a particular piece of content, one that employs Java, one that employs frames, and one that employs Active X. If content employing Java is delivered to a browser which utilizes Active X the content may be incorrectly displayed.

Figure 4:
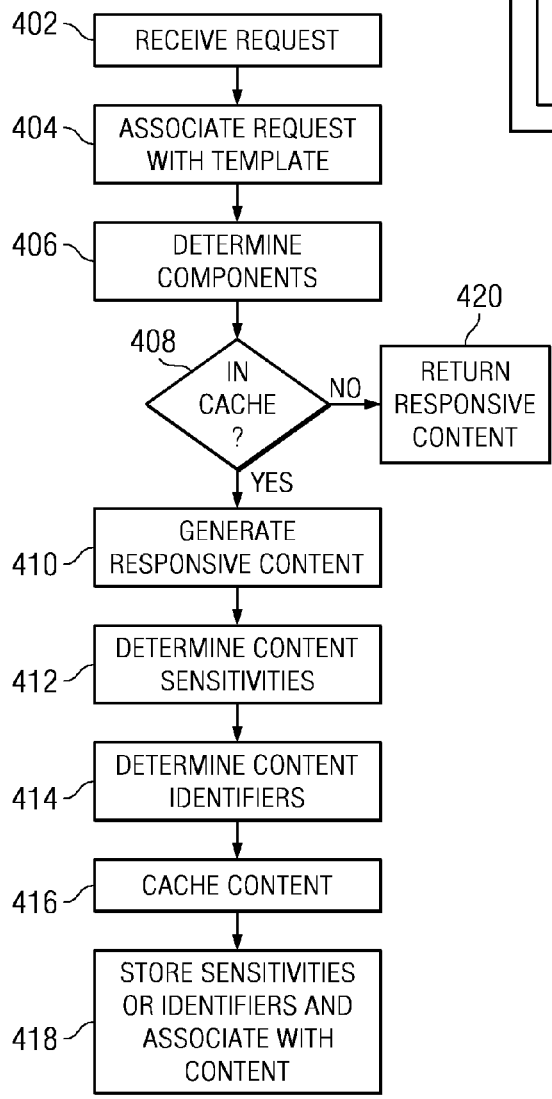
FIGS. 4 and 5 are flow diagrams for one embodiment of a method for cache management.

The data generated by modules 202, 204, 206, 208 may, in turn, be utilized in conjunction with cached content to regenerate cached content based upon added or altered content pertinent to the cache content. This ability may be explained in more detail with reference to FIGS. 4 and 5 which depicts an embodiment of the method for utilization of the extensible caching framework and its corresponding modules in conjunction with updating a cache during the operation of a web site. At step 402 a request may be received and this request associated with a template at step 404. Once a template is associated with the request at step 404 a set of components associated with the template may be determined at step 406, and for each of the components the cache may be checked to see if content responsive to the request is located in the cache at step 408.

If responsive content is found it may be returned, (e.g. used to assemble content responsive to the request) at step 420. If, however, responsive content for a component is not located in the cache the method may further comprise generating responsive content using the component at step 410 and determining rule sensitivities or content identifiers at steps 412 and 414, respectively. This generated content may then be cached at step 416 and the rule sensitivities or content identifiers stored in such a manner that they are associated with the cached content to which they correspond at step 418.

Figure 5:
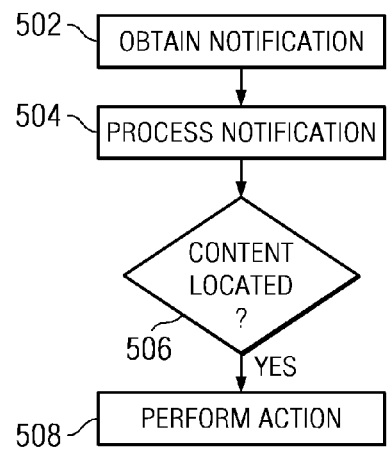

Turning now to FIG. 5, at some later point notification that content has been added or updated may be obtained (e.g. received, retrieved, fetched, etc.) at step 502. In one embodiment, this notification may comprise a generated event which comprises values associated with a set of criteria corresponding to the newly added or updated content (such as type, category, content identifier etc.). Once this notification is obtained, this notification may be processed at step 504, where the processing of the notification comprises, at step 506, locating cached content associated with the notification (e.g. pertinent to the newly added or changed content to which the notification corresponds) if it exists. Cached content may be located, in one embodiment, by comparing the values for criteria in the notification with the metadata stored in association with content in the cache (e.g. rule sensitivities or content identifiers). If any cached content is found which corresponds to the notification an action may be taken with respect to this cached content at step 508.

In one embodiment, this action may flush the located cached content such that the next time a request for the same or similar content is received new content will be generated and stored in the cache. Alternatively, the request which resulted in that cached content may be regenerated (e.g. using metadata associated with the cached content) such that the component which generated the cached content may be invoked to generate new content, and this newly generated content used to replace the located cached content. It will be apparent after reading the above that other embodiments may take almost any variety of actions with respect to the located cached content, and that these actions are within the scope of the disclosure.

Note, as well, that not all of the activities described in the process flow diagrams are required, that an element within a specific activity may not be required, and that further activities may be performed in addition to those illustrated. Additionally, the order in which each of the activities are listed is not necessarily the order in which they are performed. After reading this specification, a person of ordinary skill in the art will be capable of determining which activities and orderings best suit any particular objective of an embodiment.

Figure 6:
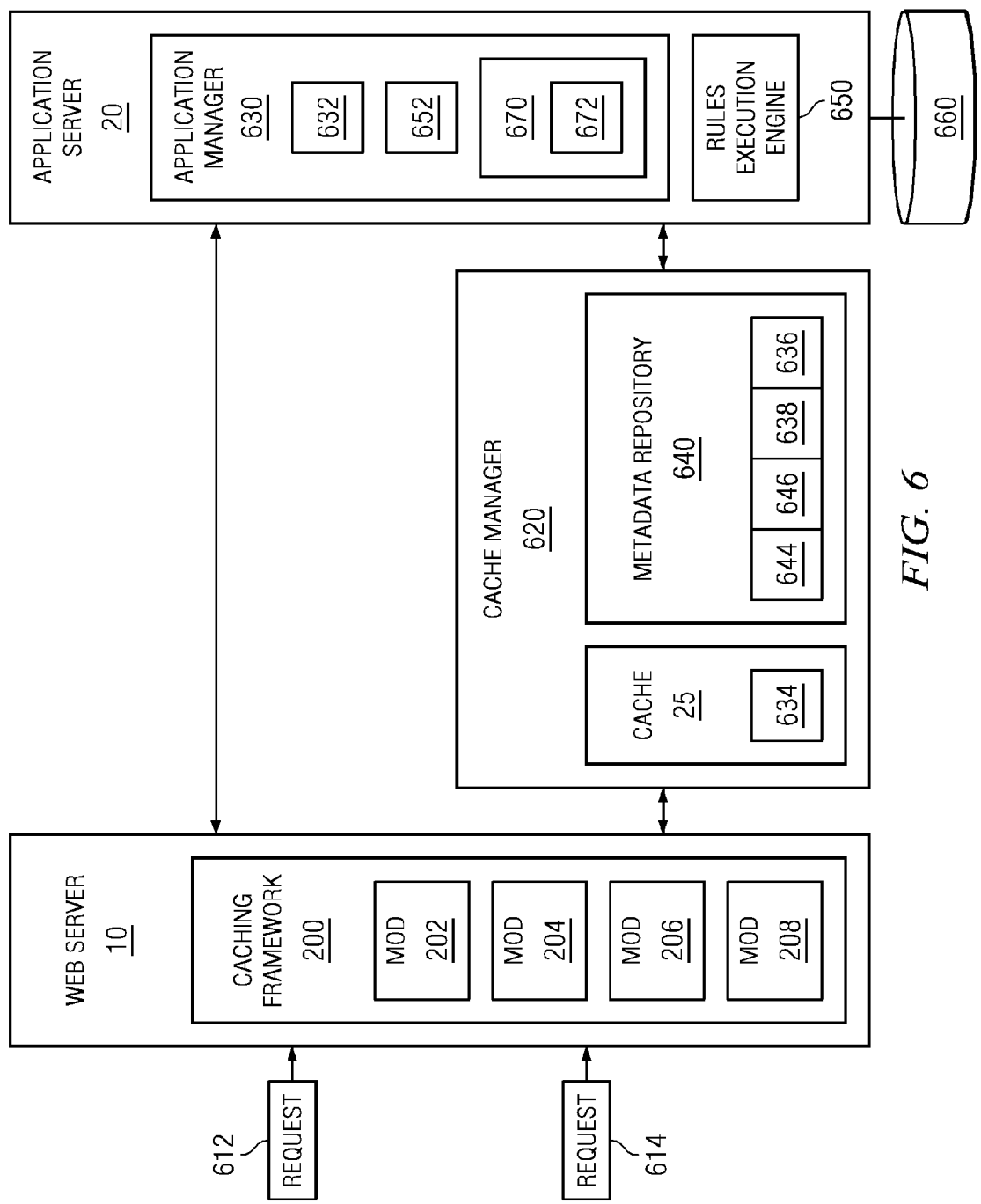
FIG. 6 is a diagrammatic representation depicting one embodiment of a system for automatic cache management.

Moving now to FIG. 6, one embodiment of an architecture for the management and automatic update of a cache is depicted. More specifically, in the embodiment depicted, cache 25 may be managed using cache manager 620 in communication with application manager 630 associated with application server 20. Cache manager 620 may be responsible for managing cache 25 (which may be a physical or logical cache) and may substantially automate the functionality of cached file placement, expiration and request regeneration.

To illustrate more clearly with respect to the embodiment depicted, when an incoming request 612 is received by web server 10 request 612 is evaluated by caching framework 200 and its associated modules 202, 204, 206, 208 as described above. To elaborate in more detail, when a request comes in from a client computer this request usually contains a URL which references content which resides on application server 20. This piece of content may be assembled utilizing various associated components and returned to a client computer based upon specifics contained in the request. Consequently, a template may be formed which contains metadata regarding aspects of a request which may pertain to assembling the specifics and subparts of a particular piece of content, as discussed above. Thus, templates corresponding to content (which includes an application server such as a JSP (Java Service Pages), etc.), which are part of a web site may be registered with the extensible caching framework where a template comprises metadata pertinent to content to be generated utilizing, or in conjunction with, that template.

Thus, after a request 612 is received by web server 10 this request may be associated with a template by extensible caching framework 200 residing on web server 10. For example, a request issued from a client computer usually contains a URL which may refer to a specific piece of content residing on application server 20, along with associated data pertaining to how a user on the client computer would like the requested content assembled. Consequently, extensible caching framework 200 can identify content that is to be assembled in accordance with this request by comparing the URL of an incoming request with registered templates associated with application server 20. Framework 200 may then associate the template corresponding to the requested content with the incoming request This identified template, in turn, may correspond to a set of components, as described above. Extensible caching framework 200 may parse or otherwise obtain information relating to the components associated with the template corresponding to the incoming request and pass this information, along with associated template metadata or other data associated with request or template, to modules 202, 204, 206, 208.

In turn, each module 202, 204, 206, 208, 210, 212 may evaluate the parameters or metadata to which it pertains. Modules 202, 204, 206, 208 invoked for this evaluation process may return several pieces of data to caching framework 200. Data which may be returned by a module 202, 204, 206, 208 may be request or template metadata which is to be stored in conjunction with cached content in order to facilitate regeneration of the request which resulted in an associated piece of cached content.

It may also be determined if requested content associated with one or more of the components of the identified template is in cache 25. If requested content associated with a component corresponding to the template is not contained in cache 25 the request 612 (or portions thereof) is passed on to application server 20, where responsive content will be generated by the components associated with the template.

When a component is invoked to generate content in response to the request 612, a set of rule sensitivities and a set of content identifiers may be also be generated based on the content used to generate content responsive to the request. This generated content along with the corresponding set of rule sensitivities and content identifiers may then be passed to cache manager 620 or web server 10.

More specifically, when request 612 is passed to application server 20, component 670 may be selected by application server 20 to generate content responsive to the request 612. This component 670 may comprise a rule 672 which is configured to select content from data store 660 based on values for a set of criteria (e.g. type of the content, category of content, time of creation, author, etc.). For example a rule may select content where the Type=News in chronological order, with a maximum number of 10 or content, where the Type=News in chronological order, with a maximum number of 5, etc. The values and corresponding criteria associated with a particular rule are known as the rule sensitivities for that rule. In other words, for a rule which selects content where the Type=News in chronological order, with a maximum number of 10 the rule sensitivities for that rule may be Type=News (or just News), or the rule sensitivities may be Type=News, Order=Time, Number=10, for a rule which selects content where Type=News AND Category=Sports AND Sport=Basketball in chronological order, with a maximum Publish date of 3 days ago the rule sensitivities may be Type=News, Cat=Sports, Sport=Basketball and PubDate=Today−3, etc. Thus, rules sensitivities may be any set or subset of the values or criteria corresponding to a rule where the criteria may comprise almost any property which may be associated with selection of content including category, navigational aspects, time periods or other properties or attributes.

Rule 672 may be executed or otherwise implemented by rule execution engine 680 resulting in the selection of content from data sore 660. Once rule 672 has been used to select content from data store 660, the selected content may be further processed by component 670 to generate content 632 corresponding to the request. This generated content 632 may then be sent to web server 10 to assemble into content responsive to request 612. Additionally, generated content 632 may be sent to cache manager 620 from application server 20 along with the rule sensitivities 644 corresponding to rule 672 of component 670 used to generate the content 632. Furthermore, the content selected by execution of rule 672 may correspond to a set of content identifiers, where a unique content identifier may be associated with each piece of content stored in data store 660. These content identifiers 646 corresponding to content selected by rule 672 in conjunction with the generation of content 632 may also be sent to cache manager 620 in conjunction with content 632 and rule sensitivities 644.

Thus, when the generated content 632 is subsequently stored in cache 25, the cached content 634 (e.g. corresponding to the generated content 632) may be associated with a corresponding set of rule sensitivities 644 and content identifiers 646. Additionally, cached content 634 may be associated with metadata 638 pertaining to the template corresponding to cached content 634, or metadata 436 corresponding to the original request 612 (as discussed above). In one embodiment, cache manager 620 comprises metadata repository 640, where each entry in metadata repository 640 corresponds with an entry in cache 25. Thus, data associated with an entry in cache 25 such as content sensitivities, content identifiers, template metadata, request metadata, etc. may be stored in conjunction with an entry of metadata repository 640 and associated with a corresponding entry in cache 25 (for example, an entry in cache 25 and a corresponding entry in metadata repository 640 may be accessed using an identical signature, hash value, etc.) Thus, data associated with an entry in cache 25 may be passed from caching framework 200 or application server 20 to cache manager 620 for storage in conjunction with content generated in response to a request. Here, entry in cache 25 comprising content 634 corresponds to an entry in metadata repository 640 comprising rule sensitivities 644, content identifiers 646, metadata 638 pertaining to a template and metadata 436 corresponding to the original request 612.

At some point subsequent, content may be added to application server 20 (e.g. data store 660 associated with application server 20). This new content may be pertinent to content in cache 25, as discussed above. Thus, it may be desirable to update cache 25 with content generated based upon the content newly added to application server 20 in order that the most up to date content may be served from cache 25 in response to another request similar to request 612. Embodiments content 634 in cache 25 to be updated with current content without receiving a new request for this content. This may be accomplished by replacing previously cached content 634 with new content generated by a component (e.g. component 670) of application manager 20 in response to a regenerated request, where the regenerated request was initiated based upon added content.

More specifically, in one embodiment, cache manager 620 may be informed that content has been added (e.g. to data store 660, or another data store or location associated with application manager 20 or web server 10). In one particular embodiment this is done through an event. When an application or content (collectively referred to as content, herein) is added in conjunction with application server 20 this content is registered with application manager 630. In turn, application manager 630 may assemble values for a set of criteria associated with the newly added content. This set of criteria may comprise properties or metadata corresponding to the newly added content (e.g. type of the content, category of content, time of creation, author, etc.)

Application manager 630 may propagate the values for the set of criteria associated with the newly added content to cache manager 620 through a communication with the cache manager 620 (e.g. an event). Communication between application manager 630 and cache manager 620 may be accomplished, for example, through the use of Java Messaging Service (JMS), Hyper Text Transfer Protocol (HTTP), Service Oriented Architecture Protocol (SOAP) or eXtensible Markup Language (XML).

When cache manager 620 receives an event, the values for the criteria associated with the event may be utilized to search cache 25 to locate any content pertinent to the event (and thus pertinent to the newly added content corresponding to the event). In one embodiments, cache manager 620 may identify content in cache 25 pertinent to the event by comparing the values for the criteria associated with the event to rules sensitivities in the metadata repository 640 associated with the entries in cache 25. More specifically, for each of the values for the criteria of the event a query may be formed using the value for that criterion such that metadata repository 640 may be queried according to the value for that criterion (e.g. entries in metadata repository 640 may be obtained where the rules sensitivities in metadata repository 640 comprises a value corresponding to the value of the query). Additionally, queries which utilize values for multiple criteria associated with the event may also be used to query metadata repository 640. In one embodiment, cache manager 620 will recursively expand the content into all known rules sensitivities that would match this content had the rule sensitivities been executed as part of a query, performing a "what if" analysis. Thus, by locating entries in metadata repository 640 responsive to these queries, the associated entries in cache 25 which are pertinent to the newly added content may be identified.

As may be imagined values for a whole host of criteria may be associated with newly added content or stored in metadata repository 640 in conjunction with cached content. Thus, it may be desirable to perform the query (e.g. between values for the incoming event and values for rules sensitivities stored in association with cached content) efficiently. To improve efficiency of this query process, therefore, in one embodiment one or more queries may be recursively generated (and possibly concatenated) for each combination of values for the criteria of the event. This query generation may generate a query for a value for one of the criteria where values for all the other criteria are NULL (e.g. the query is performed without respect to the other criteria), and then additionally recursively building a query which adds values corresponding to each of the criteria with an AND operation. Depending on the number and type of criteria, the generation of queries corresponding with an event may result in a single query with grouped sub queries joined by OR functions, or it may generate multiple queries or it may optimize queries using database functions or an IN clause where supported.

It will be noted from a close review of the above description that similar techniques may be utilized in order to update or otherwise manage a cache based upon altered content. For example, content in data store 660 may be altered, where this altered content is pertinent to content in cache 25, as discussed above. Thus, it may be desirable to update cache 25 with content generated based upon this altered content. In this case a notification from application manager 630 to cache 630 may contain the content identifier of the content which was altered. This content identifier may be used to identify content in cache 25 pertinent to the altered content (e.g. generated based upon the content before the alterations took place) by comparing the content identifier of the notification with the content identifiers stored in metadata repository 640 which correspond to entries in cache 25.

After content in cache pertinent to the notification (e.g. cache entries pertinent to newly added or altered content), action may then be taken with respect to the identified cache entries. For example, the identified cache entries may then be flushed from cache 25. Alternatively, once cache manager 620 has identified cached content (e.g. content 634) that is pertinent to newly added or altered content, cache manager 620 may update this content in cache 25. This may be done by regenerating the request that resulted in content 632 being placed in cache 25.

In one embodiment, using request metadata 636, template metadata 638 or any other data in metadata repository 640 associated with the identified cached content, cache manager 620 can regenerate the request which caused application server 620 to generate cached content. Cache manager 620 may regenerate this request and pass it to application manager 20. Application manager 20, in turn, may utilize the request to invoke the component 670 which originally generated cached content 634 to generate content 652 (which may be generated using the newly added content) responsive to this regenerated request and return this newly generated content 652 to cache manager 620. Cache manager 620 can then replace the original content 632 with newly generated content 652 responsive to the regenerated request. In this manner, content in the cache 25 may be kept substantially current with content on application server 20.

Using these various cache management techniques content can be kept up to date in cache 25 without receiving a new request. Consequently, the next time similar a request 614 is received, content 652 responsive to this request 614 may be served from cache 25 as opposed to application server 20 generating responsive content 652 in response to the request.

Serving responsive content 652 from cache 25 allows a web site to more quickly respond to an incoming request and reduces the strain on application server 20.

Figure 7:
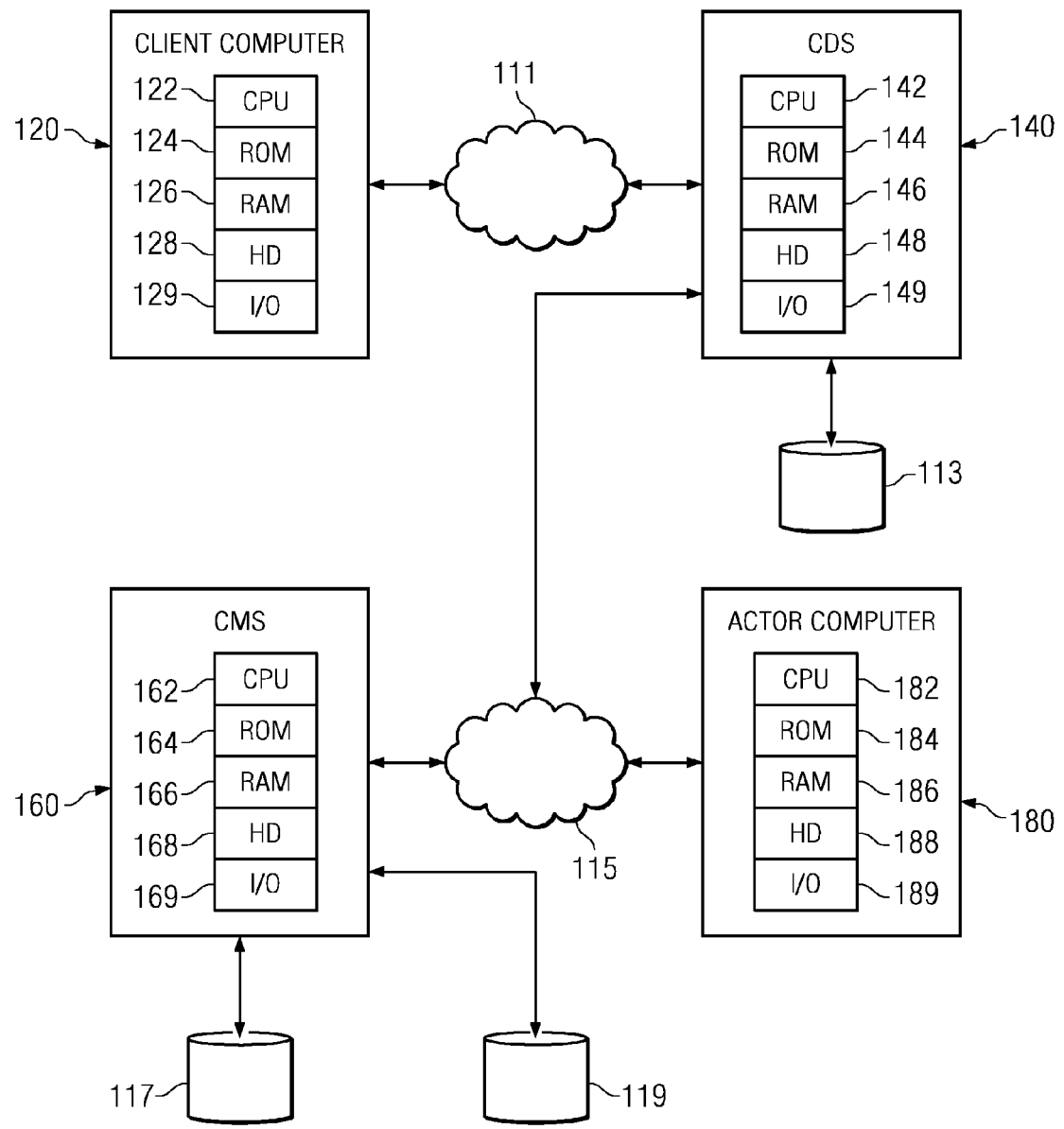
FIG. 7 is a diagrammatic representation of a hardware configuration of a network environment implementing embodiments disclosed herein.

FIG. 7 illustrates an exemplary architecture and includes external network 11 that can be bi-directionally coupled to client computer 120 and content delivery system ("CDS") 140. CDS 140 can be bi-directionally coupled to database 113. An internal network 115 can be bi-directionally coupled to CDS 140, content management system ("CMS") 160, and actor computer 180. CMS 160 can be bi-directionally coupled to databases 117 and 119, each of which may contain data objects and metadata regarding those objects in tables within those databases. CDS 140, CMS 160, and databases 113, 117, and 119 may be part of a network site. Note that FIG. 7 is a simplification of a hardware configuration.

Within each of CDS 140 and CMS 160, a plurality of computers (not shown) may be interconnected to each other over internal network 115 or a combination of internal and external networks. For simplification, a single system is shown for each of CDS 140 and CMS 160. Other systems (e.g., page generator, application server, etc.) may be part of CDS 140, CMS 160, or additional systems that are bi-directionally coupled to the internal network 115.

A plurality of other client computers 120 may be bi-directionally coupled to external network 111, and a plurality of actor computers 80 may be coupled to internal network 115. Actor computers 80 may include personal computers or workstations for individuals that use internal network 115. These individuals may include content developers, editors, content reviewers, webmasters, information technology specialists, and the like. Many other alternative configurations are possible and known to skilled artisans.

Client computer 120 can include central processing unit ("CPU") 122, read-only memory ("ROM") 124, random access memory ("RAM") 126, hard drive ("HD") or storage memory 128, and input/output device(s) ("I/O") 129. I/O 129 can include a keyboard, monitor, printer, electronic pointing device (e.g., mouse, trackball, etc.), or the like. Client computer 120 can include a desktop computer, a laptop computer, a personal digital assistant, a cellular phone, or nearly other device capable of communicating over a network. Actor computer 180 may be similar to client computer 120 and can comprise CPU 182, ROM 184, RAM 186, HD 188, and I/O 189.

CDS 140 can include a server computer comprising CPU 142, ROM 144, RAM 146, HD 148, and I/O 149, and CMS 160 can include a server computer comprising CPU 162, ROM 164, RAM 166, HD 168, and I/O 169. CDS 140 or CMS 160 may have one or more of a content delivery software component, a page generator software component, the content management software component, an applications software component, and the like.

Each of the computers in FIG. 7 may have more than one CPU, ROM, RAM, HD, I/O, or other hardware components. For simplicity, each computer is illustrated as having one of each of the hardware components, even if more than one is used. The content and its metadata, if any, may be located within any or all of CDS 140, CMS 160, and databases 113, 117, and 119. During staging, a user at actor computer 180 may have access to proxy objects for the content. After staging, data objects may be copied into database 113 via CDS 140, so that the data object may be accessed quicker by CDS 140 to respond to requests from client computer 120. Another advantage is that this separation of content items and proxies allows CDS 140 to deliver one version of a content item (or collection of content items) while the "original" undergoes modification in CMS 160.

Each of computers 120, 140, 160, and 180 is an example of a data processing system. ROM 124, 144, 164, and 184; RAM 126, 146, 166, and 186; HD 128, 148, 168, and 188; and databases 113, 117, and 119 can include media that can be read by CPU 122, 142, 162, or 182. Therefore, each of these types of memories includes a data processing system readable medium. These memories may be internal or external to computers 120, 140, 160, or 180.

Figure 8:
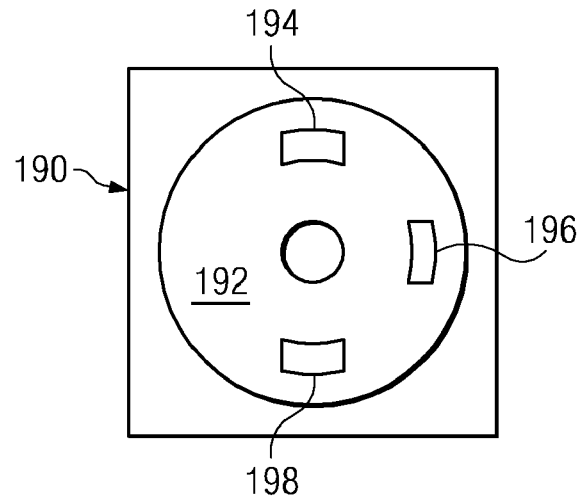
FIG. 8 is a diagrammatic representation of a computer readable storage medium storing computer executable instructions implementing a method of invalidating cached pages and regenerating pages based on invalidation events according to one embodiment disclosed herein.

Portions of the methods described herein may be implemented in suitable software code that may reside within ROM 124, 144, 164, or 184, RAM 126, 146, 166, or 186, or HD 128, 148, 168, or 188. In addition to those types of memories, the instructions in an embodiment may be contained on a data storage device with a different data processing system readable storage medium, such as a hard disk. FIG. 8 illustrates a combination of software code elements 194, 196, and 198 that are embodied within a data processing system readable medium 192, on HD 190. Alternatively, the instructions may be stored as software code elements on a DASD array, magnetic tape, floppy diskette, optical storage device, or other appropriate data processing system readable medium or storage device.

Figure 9:
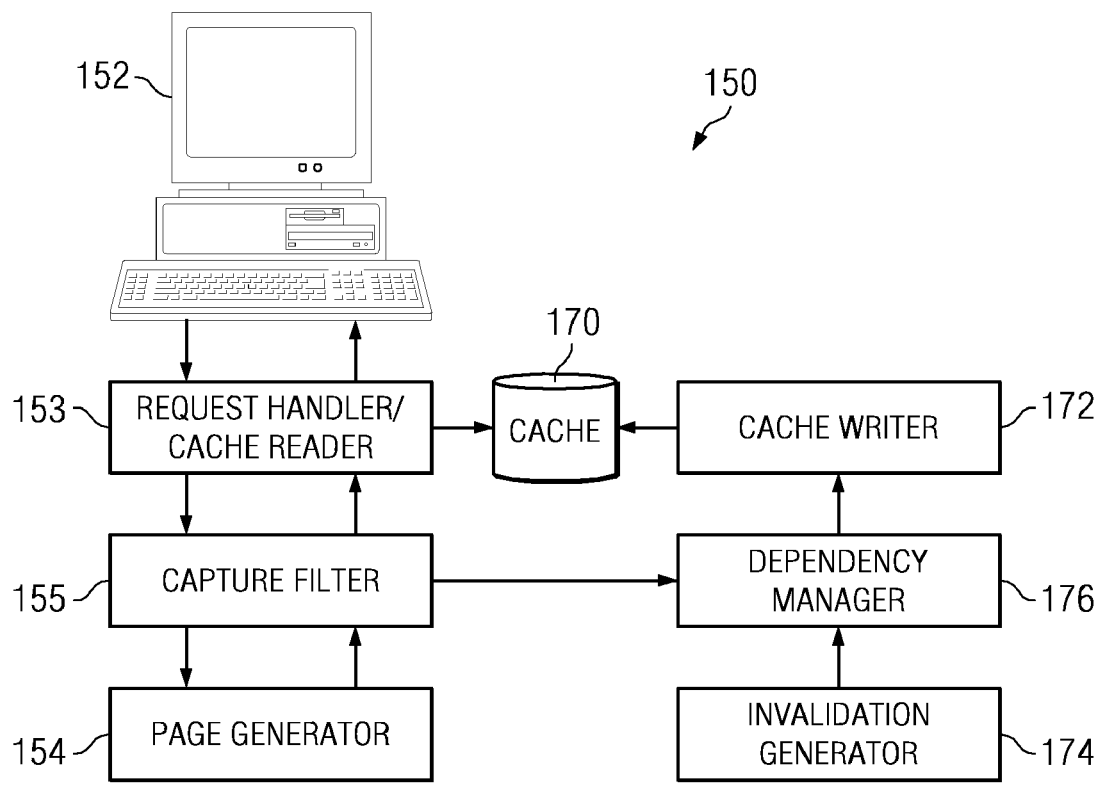
FIG. 9 illustrates one embodiment of system architecture for invalidating cached pages and regenerating pages based on invalidation events.

With reference now to FIG. 9, one embodiment of architecture 150 is illustrated. Architecture 150 can allow end users to access content via user device 152. Architecture 150 can include request handler/cache reader 153, page generator 154, capture filter 155, page cache 170, cache writer 172, invalidation generator 174, and dependency manager 176. These devices 152-155, 170, 172, 174, and 176 can be networked together by various local area networks (LANs) and wide area networks (WANS) and can communicate with user device 152 via various telecommunication systems such as the Internet.

When a request for content is received from user device 152, request handler/cache reader 153 can determine whether page cache 170 contains the requested content. When page cache 170 contains the requested content, request handler/cache reader 153 can serve that content to user telecommunications device 152. When page cache 170 does not contain the requested content, request handler/cache reader 153 can forward the request to capture filter 155. Capture filter 155 can set up cache control information associated with the requested content and pass such information and control to page generator 154. Page generator 154 can generate the requested content (in conjunction with some content source(s) in some embodiments) and return the requested content to capture filter 155. Page generator 154 can annotate the cache control information with additional information regarding the requested content and return the annotated cache control information with the requested content. Capture filter 155 can forward the requested content and annotated cache control information to request handler/cache reader 153. Request handler/cache reader 153 can then serve the requested content to user device 152.

In the meantime, capture filter 155 can parse the annotated cache control information for information pertaining to the dependency of certain objects within the requested content on other objects within the requested content (or associated therewith). Capture filter 155 can forward the requested content and associated dependency and cache control information to dependency manager 176. Dependency manager 176 can forward the requested content to cache writer 172 for storage in page cache 170. Dependency manager 176 can store the dependency information and cache control information for subsequent use. Invalidation generator 174 will notify dependency manager 176 that one or more objects on which pages in page cache 170 depend have been modified. Dependency manager 176 then uses the dependency information that it stored earlier to identify pages in page cache 170 that should be invalidated.

Figure 10:
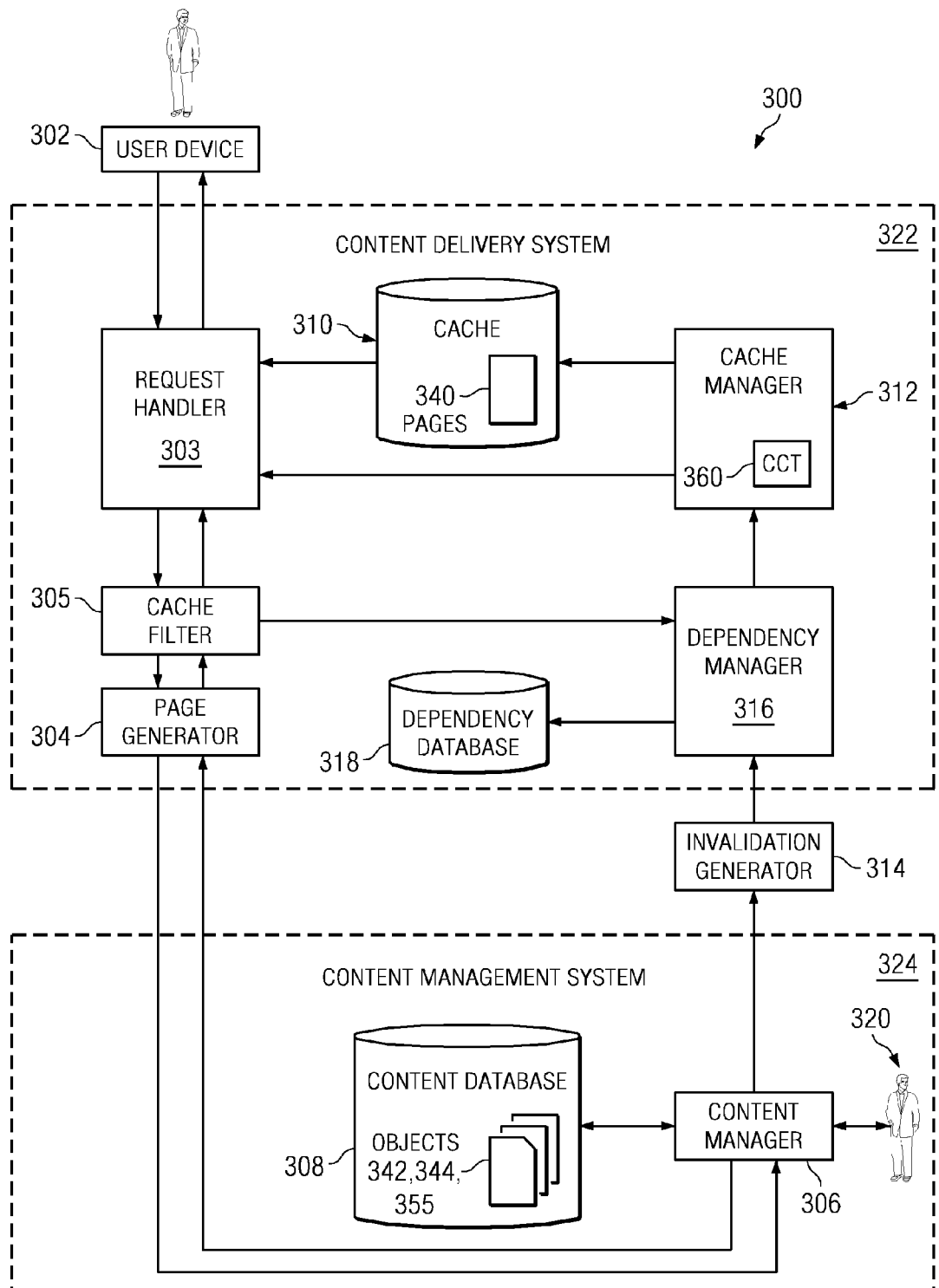
FIG. 10 illustrates one embodiment of a content delivery system comprising a plurality of components for invalidating cached pages and regenerating pages based on invalidation events.

With reference now to FIG. 10, one embodiment of system 300 is illustrated. End users can access system 300 via user device 302 to request that pages (or other data structures) conveying content be delivered to them. User device 302 can communicate with request handler 303 via the Internet or other telecommunications systems, networks, etc. System 300 can include request handler 303, capture filter 305, content manager 306, page generator 304, content database 308, page cache 310, cache manager 312, dependency manager 316, and dependency database 318. In some embodiments, request handler 303, content manager 306, content database 308, page cache 310, cache manager 312, invalidation generator 314, dependency manager 316, and dependency database 318 can be networked together via various local area networks (LANs) and wide area networks (WANs).

In some embodiments, system 300 can serve pages to portals operating on the Internet or an enterprise network. In some embodiments, system 300 can include a separate content management system 324, a separate content delivery system 322, and a separate invalidation generator 314 in communication with content management system 324 and content delivery system 322. In some embodiments, content management system 324 can include content manager 306, and content database 308. In some embodiments, content delivery system 322 can include request handler 303, page generator 304, capture filter 305, page cache 310, cache manager 312, dependency manager 316, and dependency database 318.

Figure 11:
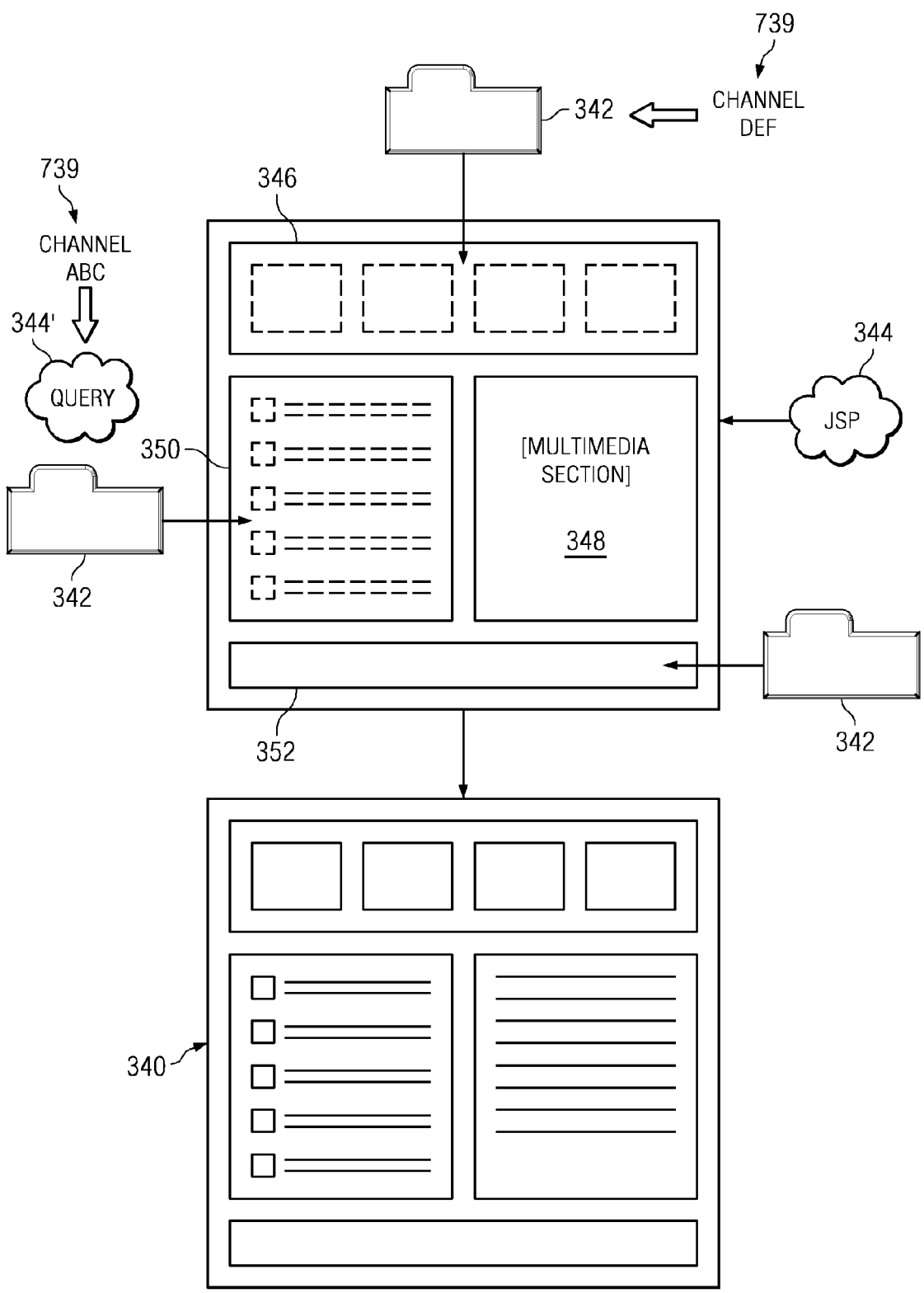
FIG. 11 illustrates one embodiment of a page.

FIG. 11 illustrates one embodiment of page 340. Content delivery system 322 can generate and deliver pages 340 via user device 302. Pages 340 can include various content objects 342 and code objects 344. Content objects 342 can include text, audio, still image, video, multi-media, etc. objects for presentation via page 340. Code objects 344 can include various JSPs (Java Server Pages) servlets, active server pages (ASPs), scripts such as VB Scripts or JScripts, ADOs (ActiveX Data Objects), etc. which control the appearance of page 340 or otherwise operate on content objects 342. Thus, page 340 can be assembled from content objects 342 using code objects 344. More particularly, various sections 346, 348, 350, and 352 can be used to present content conveyed by content objects 342 as controlled by code objects 344. Page 340 can therefore be dependent on content objects 342 and code objects 344 for content, appearance, functionality, or combinations thereof. U.S. patent application Ser. No. 10/358,746, entitled "CENTRALIZED CONTROL OF CONTENT MANAGEMENT TO PROVIDE GRANULAR ENTERPRISE-WIDE CONTENT MANAGEMENT", by Jeffrey M. Collins, and filed on May 20, 2003 describes systems and methods for generating pages 340 and is incorporated herein as if set forth in full.

In some embodiments, pages 340 can be static pages containing dynamically provisioned content. U.S. patent application Ser. No. 11/444,023, entitled "SYSTEM AND METHOD FOR THE DYNAMIC PROVISIONING OF STATIC CONTENT", filed on May 31, 2006, by Rajkumar et al. discloses systems and methods for the dynamic provisioning of static content and is incorporated herein as if set forth in full. In some embodiments, pages 340 can be dynamic pages containing dynamically generated content. U.S. patent application Ser. No. 11/444,020, entitled "SYSTEM AND METHOD FOR THE PROVISIONING OF DYNAMICALLY GENERATED CONTENT", filed on May 31, 2006, by Rajkumar et al. discloses systems and methods for the provisioning of dynamically generated content and is incorporated herein as if set forth in full.

With reference again to FIG. 10, page cache 310 can include various pages 340 which may have, at some time or other, been requested by end users or placed in page cache 310 by system administrators or other actors associated with content delivery system 322. In some situations, page cache 310 may contain millions of pages 340 or more. Cache manager 312 can read from, write to, and perform other functions with respect to page cache 310. More particularly, cache manager 312 can write pages 340 to page cache 310, read pages 340 from page cache 310, and discard certain pages 340 from page cache 310.

When performing certain functions associated with page cache 310, cache manager 312 can utilize a cache control table or some other data structure providing similar functionality to cache manager 312. With reference now to FIG. 12, one embodiment of cache control table 360 is illustrated. Cache control table 360 can include entries 361 for various pages 340. Each particular entry 362, 364, 366, 368, 370, 372, and 374 can correspond to a particular page 340 in page cache 310. In some embodiments, cache manager 312 distributes entries 362, 364, 366, 368, 370, 372, and 374 with the corresponding pages 340 in page cache 310 instead of utilizing cache control table 360. For each page 340, though, cache control table 360 can include cache directory 378, page identifier 380, Time to Live (TTL) 382, and regeneration information 386. Uniform Resource Locators (URLs) 376 can indicate the network locations of pages 340 and are shown in cache control table 360 for reference. In some embodiment, URLs 376 are not stored in cache control table 360. In various embodiments, other methods of identifying pages 340 could be used to associate entries 378, 380, 382, 384, and 386 of cache control table 360 with particular pages 340. For instance, as will be described below, cache manager 312 can use hashes of URLs 376 to locate pages 340 in page cache 310. In some embodiments, cache manager 312 can use cache directory 378 and page identifier 380 (instead of URLs 376) to locate pages 340 in page cache 310.

In some embodiments, cache directory 378 and page identifier 380 for a particular entry 361 can be derived using a one-way hash of the URL 376 of that page 340. More particularly, a hash function can be chosen so that, for any two URLs, the resulting hashes will most certainly differ even when the particular pages 340 have relatively small differences between them. For instance, a comparison of entries 370 and 372 illustrates that even a very small change (for instance, the difference between "Support1" and "Support2" in URLs) can result in widely different hash values. Thus, the hash function can produce a unique hash for each URL 376. One suitable hash function is Message-Digest algorithm (MD5) which produces a 128-bit hash value. Other cryptographic hash functions and digital finger printing methods may also be suitable for implementations. For exemplary teachings on managing caches using hashed URLs, readers are directed to co-pending U.S. patent application Ser. No. 12/206,909, entitled "SYSTEM AND METHOD FOR MANAGING LARGE FILE SYSTEM-BASED CACHES", and filed Sep. 9, 2008, which is incorporated herein by reference.

In some embodiments, each page identifier 380 can be derived from the hash of URL 376 corresponding to a particular page 340. In some embodiments, each cache directory 378 can be derived from portions of a hash of URL 376 corresponding to a particular page 340 and, in some embodiments, variation information pertaining thereto. Referring to FIG. 12, for entry 362, "http://www.vignette.com/" has a 20-bit hexadecimal hash value of:

QWERTYUIOPPASRASDFGH

FIG. 12 shows that a prefix of six characters "QWERTY" and a prefix of eight characters "UIOPPASR" of the hash value are used to create a cache directory "QWERTY/UIOPPASR/" and that six characters "ASDFGH" were used for page identifier 380. Together, these particular entries 378 and 380 can form a particular overall cache path QWERTY/UIOPPASR/ASDFGH. One skilled in the art can appreciate that any number of characters of the hash value can be used and appropriate control characters such as "/" can be inserted as desired without departing from the scope of the disclosure. Moreover, other hash functions or other page identifiers may also be used without departing from the scope of the disclosure.

With continuing reference to FIG. 12, TTL entries 382 illustrate that, in some embodiments, page cache 310 can include "time to live" functionality to limit the likelihood that some pages 340 will become stale. In such embodiments, each page 340 can have a corresponding time limit as specified in TTL entries 382. Request handler 303 can check TTL entries 382 before obtaining page 340 from page cache 310 and discard a particular cached page if it has expired. In some embodiments, cache manager 312 can discard such expired pages 340 and cause regeneration of the same. For a given page 340, TTL entry 382 can be set when cache manager 312 writes the corresponding page 340 to page cache 310.

The above-described TTL approach has several limitations. For example, stale pages 340 may remain in page cache 310 between TTL driven regenerations. However, content, on which pages 340 depend, may be updated, deleted, or created, from time-to-time by content manager 306 FIG. 10. As a result, unless pages 340 are regenerated on a frequent basis, pages 340 in page cache 310 will be stale until such time as they are regenerated.

The above-described TTL approach may also cause some non-stale, valid pages 340 to be regenerated needlessly. Such needless page regenerations can occur when certain cached pages 340 are relatively stable compared to their TTL entries 382. Thus, some cached pages 340 might be regenerated too frequently under the TTL approach, wasting network and processing resources.

Regeneration entries 386 of cache control table 360 can indicate whether a page may be regenerated or not. Cache manager 312 can decide whether or not to regenerate a particular page 340. When cache manager 312 receives an invalidation event for a particular page 340, cache manager 312 can kill that page 340 if regeneration entry 386 indicates that page 340 should not be regenerated. If regeneration entry 386 indicates that that page 340 may be regenerated, cache manager 312 can compare information regarding how often that page 340 is accessed (for instance, the last access time) to determine whether that page 340 is accessed frequently enough to make regeneration desirable. If so, cache manager 312 can issue an appropriate regeneration request to page generator 304. If not, cache manager 312 can delete page 340 or remove references to page 340 from page cache 310.

FIG. 13 illustrates one embodiment of dependency table 700 of dependency database 318 in which various dependencies 701 can be listed. FIG. 13 illustrates that dependency table 700 can include an arbitrarily large number n of object identification entries 704 for each dependency 701. Each dependency 701 can be a tuple identifying a page 340 and one or more objects 342 and 344 (see FIG. 11) on which that page 340 depends. Thus, each dependency 701 may contain a reference to a single page 340 and reference(s) to one or more objects 342 and 344 on which the single page 340 depends. In embodiments disclosed herein, a page 340 may have zero or more dependencies associated therewith.

In some embodiments, hash value 702 corresponding to an URL for a particular page 340 is used to identify that particular page 340. For example, dependency 706 for a particular page 340 may contain a hash value of "QWERTYUIOPPAS-RASDFGH" referencing that particular page 340 and a reference to object 801, indicating that this particular page 340 depends on object 801. The same particular page 340 may also depend on object 802 according to dependency 708. Another page 340, as indicated by dependencies 710, 712, and 714, may depend on object 801, object 804, and object 810. In some embodiments, modification to a single object may invalidate a page, regardless whether that page also depends on other objects. In some embodiments, modification to a single object may invalidate more than one page. For example, suppose object 801 of FIG. 13 has been modified, all pages that depend on object 801, including those referenced by dependencies 706 and 710, would be invalidated. In some embodiments, dependencies referencing pages that have been invalidated due to the modification to object 801 would be removed from dependency table 700 of dependency database 318.

With continuing reference to FIG. 13, dependencies 716 and 718 illustrate that certain pages 340 (corresponding to hash values 702 of SZHJUYDFGYHJJIHJJKKY and VJLKJLRADHYIKVXCFSRD) can directly depend on object 808 and object 809. Such dependencies can be deemed "direct dependencies" since if object 808 or 809 is modified, the particular pages 340 which depend thereon can become stale in page cache 310.

Dependency table 700 also illustrates one embodiment of "set dependencies" 703. Set dependencies 703 can include collections of objects 342 and 344 as reflected by various object entries 704. As illustrated by FIG. 13, set dependency 720 and set dependency 722 can include, respectively, a certain set 811 of objects (object 802 and object 810) and another certain set 812 of objects (object 802, object 803, object 805, object 806, and object 807). FIG. 13 further illustrates that certain dependencies 724 and 726 can depend on set dependencies 720 and 722 (object set 811 and object set 812) respectively. FIG. 13 illustrates that set dependencies 720 and 722 can be nested such that certain nested dependencies 728 can depend on set dependencies 720 and 722 as well as other objects (for instance, object 808). In some embodiments, a single level of nesting can be sufficient.

Still referring to FIG. 13, certain pages 340 may depend on certain objects 342 and 344 directly, or through set dependencies 703. More specifically, dependency table 700 indicates that pages 340 corresponding to dependencies 706 and 710 (among others) can depend on object 801 directly. Dependency table 700 indicates that a certain page 340 (corresponding to dependency 708) can depend on object 802 directly. Dependency table 700 indicates that pages 340 corresponding to dependencies 724 and 726 can depend on object 802 indirectly through set dependencies 720 and 722. Nested dependency 728 indicates that some set dependencies 703 can depend on object sets 811 and 812 (see set dependencies 720 and 722). FIG. 13, therefore, illustrates that set dependencies 703 can be nested.

In some embodiments, dependency manager 316 (of FIG. 10) can allow direct dependencies 701 and set dependencies 703 to accumulate in dependency table 700. Dependency manager 316 can allow dependencies 701 and 703 to reside in dependency table 700 even when some dependencies 701 and 703 in whole, or in part, duplicate other dependencies 701 and 703. When pages 340 are removed from page cache 310, dependency manager 316 can delete dependencies 701 and 703 corresponding to the particular removed pages 340. Thus, FIG. 13 illustrates certain aspects of dependencies 701 and 703. When pages 340 are modified, dependency manager 316 can overwrite dependencies 701 and 703 with correspondingly modified dependencies 701 and 703.

Figure 14:
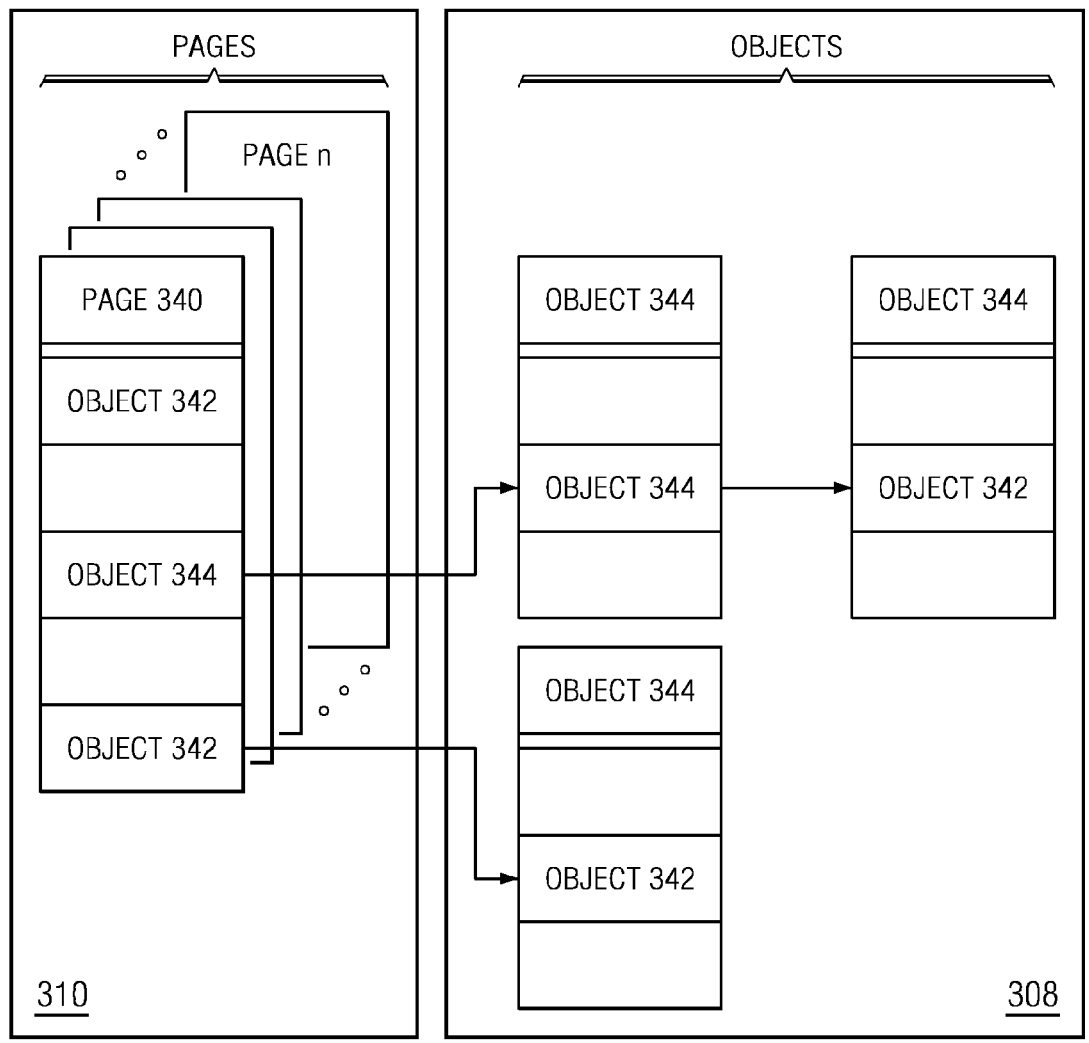
FIG. 14 illustrates the relationship between pages stored in one embodiment of a page delivery cache and objects stored in one embodiment of a content database.

FIG. 14 illustrates the relationship of objects stored at one embodiment of content database 308 and pages stored at one embodiment of page cache 310. Content database 308 can include various objects 342 and 344 on which page 340 (in page cache 310) may depend. Content database 308 can reflect the hierarchical nature of many cached pages 340 and objects 342 and 344. Some objects 342 and 344 may be relatively simple in that they depend on no other objects 342 and 344. Other objects 342 and 344 can depend on yet other objects 342 and 344. Still other objects such as object 342 and 344 may depend on other objects such as object 342 and 344 which can depend on still other objects 342 and 344. Nested dependencies, such as nested dependency 728 (see FIG. 13), can describe objects 342 and 344 which depend on other objects 342 and 344 and, through object 342 and 344, can depend on still other objects 342 and 344. Thus, when any of objects 342 and 344, on which cached page 340 might depend, is modified in content database 308, cached page 340 in page cache 310 can become stale.

With reference again to FIG. 10, system 300 of some embodiments can operate to create, manage, deliver, invalidate, and regenerate pages 340. End users can access user devices 302 to request content from content delivery system 322. The requested content may comprise a plurality of pages which may or may not be in page cache 310. When a particular requested page is in page cache 310, request handler 303 can service the request by returning cached page 340 from page cache 310 to user device 302. When a requested page is not in page cache 310, request handler 303 can forward the request for page generation. Page generator 304 can build the requested page using objects 342 and 344 stored in content database 308 and forward the newly generated page to capture filter 305. Various dependencies 701 and 703 discovered at page creation time by page generator 304 can also be forwarded to capture filter 305. Capture filter 305 can pass the newly generated page 340 and its dependencies 701 and 703 to dependency manager 316 and request handler 303. Request handler 303 can then pass the requested page 340 to user device 302, thereby satisfying the request. Dependency manager 316 can store dependencies 701 and 703 in dependency database 318 and forward the newly generated page 340 to cache manager 312 as described above.

Content management system 324 can allow certain actors 320 to create, maintain, modify, update, and delete content including objects 342 and 344 stored in content database 308. Content management system 324 can publish managed content to a deployment agent at the deployment stage. In some embodiments, this deployment agent incorporates invalidation generator 314. In some embodiments, invalidation generator 314 can have access to a version of the managed content or some versioning information of the managed content. In some embodiments, invalidation generator 314 may store a version of the managed content or some versioning information locally at the deployment stage.

Invalidation generator 314 may determine, based on the modifications to objects 342 and 344, what, if any, invalidation events should be produced and sent to dependency manager 316 of content delivery system 322. More specifically, by comparing the newly published content with the previous version, invalidation generator 314 can determine whether one or more objects 342 and 344 have been modified since the last publication. In some embodiments, for each object modification, invalidation generator 314 can produce and send to dependency manager 316 an invalidation event correspondingly.

Dependency manager 316 can receive the invalidation events from invalidation generator 314 and store them in a queue or other data structure. By comparing object modification information contained in the invalidation events and dependency information stored in dependency database 318, dependency manager 316 can determine if any page 340 is to be invalidated based on its dependency on an object that has been modified. In some embodiments, a single page 340 can be invalidated based on a single invalidation event. For each page 340 that is to be invalidated, dependency manager 316 can output a page invalidation notification to cache manager 312 accordingly.

In operation, system 300 can create new versions of pages 340, invalidate cached pages 340, and regenerate pages 340. In a cache hit scenario, request handler/cache reader 303 can serve a particular requested page 340 from page cache 310 via cache manager 312. In a cache miss scenario, a particular requested page 340 cannot be found in page cache 310). In such cases, request handler 303 can request that page generator 304 generate the particular requested page 340. In generating the requested page 340, page generator 304 can determine dependencies 701 and 703 for the requested page 340. Page generator 304 can send the particular requested page 340 and corresponding dependencies 701 and 703 to request handler 303 via capture filter 305. Request handler 303 can serve that page 340 to user device 302. Capture filter 305 can forward the newly generated page 340 to dependency manager 316 along with dependencies 701 and 703. Dependency manager 316 can store dependencies 701 and 703 in dependency database 318 and forward the newly generated page 340 to cache manager 312. Cache manager 312 can then write the recently requested, newly generated page 340 to page cache 310, thereby overwriting stale page 340. On the next request for that same particular page 340, request handler 303 can serve that particular page 340 from page cache 310. Page 340 may reside in page cache 310 for some time during which one or more objects 342 and 344 in content database 308 may be modified or otherwise updated.

When invalidation generator 314 detects that a modification has occurred to a particular object 355, it can generate an invalidation event and send it to dependency manager 316. Dependency manager 316 can receive the invalidation event and check dependency database 318 for and all pages 340 that might depend on object 355. In cases in which a particular page 340 depends on object 355, dependency manager 316 can send cache manager 312 a page invalidation notification indicating that that cached page 340 may have become invalid. Cache manager 312 can request page generator 304 to regenerate a new version of page 340. Page generator 304 then regenerates page 340 and determine page dependencies as described above.

Page generator 304, in regenerating page 340, can read objects 342 and 344 (including object 355) from content database 308 via content manager 306. In some situations, page generator 304 might only read object 355 which has been modified since page 340 was last regenerated. In any case, at some time later, page generator 304 can finish regenerating a new version of page 340 and send it to request handler 303.

After page 340 is regenerated, cache manager 312 can replace cached page 340 with regenerated page 340 in page cache 310. The regenerated page 340 or a version thereof can be served to requesting users via request handler 303. In the meantime, though, object 355 (or some other object 342 or 344 on which the regenerated version of page 340 might depend) may have been modified again by some actor 320. Thus, page 340 may be invalid again even before 1) page generator 304 finishes regenerating it; 2) request handler 303 serves regenerated page 340 to some end user; or 3) cache manager 312 writes regenerated page 340 to page cache 310. The object modifications occurring during page generation can be deemed "overlapping modifications".

Some embodiments can include provisions for preventing overlapping modifications from causing invalidated pages 340 to be written to page cache 310. More particularly, when page generator 304 begins regenerating new versions of pages 340 (or begins generating new pages 340), page generator 304 can notify dependency manager 316 that it has begun a page generation session associated with certain pages 340 and objects 342 and 344. Dependency manager 316 can register such a regeneration session and monitor incoming invalidation events for overlapping modifications affecting objects 355 on which page 340 might depend (and for other modifications affecting page 340 if desired).

When dependency manager 316 receives a second, and overlapping, invalidation event during the session, dependency manager 316 can retain the previous and current invalidation events rather than discarding them. In some embodiments, dependency manager 316 may store incoming invalidation events locally, in dependency database 318, or in some other data structure. In the meantime, page generator 304 can finish regenerating a new version of the particular affected page 340 and notify dependency manager 316 that the regeneration session is complete. Page generator 304 can send dependency manager 316 regenerated page 340 and dependencies 701 and 703 associated therewith (via capture filter 305).

Dependency manager 316 can receive regenerated page 340 and dependencies 701 and 703 from page generator 304 and determine, based on invalidation events accumulated during the session and dependency information stored in dependency database 318, if any overlapping object modifications have occurred during the session. If so, the newly generated page may be invalidated.

As discussed previously, in some embodiments, dependency manager 316 can maintain a list (or other structure) in dependency database 318 pertaining to object modifications. Thus, dependency manager 316 can traverse the list back to such time as when page generator 304 began the page regeneration session searching for overlapping modifications. When dependency manager 316 determines that at least one overlapping object modification exists, dependency manager 316 can request that cache manager 312 invalidates the subject page via a page invalidation notification. Cache manager 312 can request invalidated pages 340 be regenerated as described above.

In some embodiments, when dependency manager 316 determines that no overlapping modifications exist, dependency manager 316 can notify cache manager 312 to write the regenerated page 340 to page cache 310. With continuing reference to FIG. 10, writing pages 340 to page cache 310 can involve some amount of time. As a result, it can be the case that some overlapping object modifications might have occurred while new versions of regenerated pages 340 are being written to page cache 310. In such situations, regenerated pages 340 can be invalid even before they are written to page cache 310, served to user device 302, etc.

Thus, in some embodiments, instead of having regenerated pages 340 written to page cache 310, dependency manager 316 can notify cache manager 312 to store a regenerated page 340 in a temporary location in page cache 310. Cache manager 312 can acknowledge the temporary storage requested by dependency manager 316. Dependency manager 316 can then determine whether overlapping modifications have occurred during the write operation. If so, dependency manager 316 can notify cache manager 312 to invalidate the particular affected page 340. Cache manager 312 can request regeneration of the invalidated page 340 which is cached at a temporary location. If no overlapping object modifications have occurred while writing the regenerated page 340 to a temporary location, dependency manager 316 can request that cache manager 312 move the regenerated page 340 to a permanent location in page cache 310. In some embodiments, the above described process can be repeated.

Thus, system 300 can be utilized to invalidate and, when desired, regenerate pages when events occur which modify objects 342 and 344 on which various pages 340 may depend. However, some events can cause certain pages 340 to become stale which do not necessarily modify any particular object 342 and 344 or the content therein. For instance, when page 340 depends on the membership of a set of objects 342 and 344, changes to the membership of that set can cause page 340 to become stale. More particularly, if a certain object 342 or 344 in the set on which some page 340 depends is deleted, the membership of that set changes accordingly. In such situations, cached page 340 might still contain information from the particular deleted object 342 and 344 even though content database 308 no longer contains that particular object 342 and 344. When a particular object 342 and 344 is created and page 340 depends on a set which contains that particular newly created object 342 and 344, cached page 340 might not contain that particular recently created object 342 and 344 while content database 308 might contain that particular object. One situation, of many, in which pages 340 depend on sets of objects 342 and 344 can be when pages 340 rely on one or more queries (which identify those sets of objects 342 and 344 and insert those sets of objects 342 and 344 into pages 340).

Another aspect of objects 342 and 344 which can affect their membership in sets can be attributes of objects 342 and 344. Attributes of object 342 and 344 can include their titles, bodies, etc. for which each object 342 and 344 can have various values. Various attributes can be associated with objects 342 and 344 according to the type of object 342 and 344 that particular objects 342 and 344 belong to. Since some pages 340 can include certain objects 342 and 344 depending on whether their attributes meet some criteria, modifications affecting those object 342 and 344 attributes can cause some pages 340 to become stale. Events which alter the membership of various sets of objects 342 and 344 (by, for example, creating or deleting objects 342 and 344 in the sets or changing object 342 and 344 attributes), can be deemed "contextual invalidation events" herein.

In some embodiments, objects such as articles can be associated with channels 739 as illustrated by FIG. 11. Channels 739 can be logical collections of objects 342. Some content delivery systems 322 (see FIG. 10) use channels 739 to organize web sites. In one embodiment, a news related web site might have associated with it different channels 739 for world news, local news, sports news, weather, etc. Each channel 739 can have subchannels (not shown) which can further organize objects 342 for various web sites. Pages 340 in the web site can be rendered in the context of a particular channel 739 or channels 739 so that content associated with objects 342 and 344 in those pages 340 can be derived from content associated with the particular channels 739.

In some embodiments, pages 340 can be generated from page templates which can include objects 344 which can provide access to, and control access to, content from channels 739. One such object 344 can be query object 344'. Query object 344' can, at run-time, identify sets of objects 342 for inclusion in pre-generated pages 340. Query object 344' can include criteria for identifying objects 342 for inclusion in the set. In one embodiment, query object 344' can be specified as follows:

Select content of type Article
    where Channel equals [currentChannel]
    sort by System Name ascending When executed, query object 344' can retrieve objects of type "Article" which are associated with the current channel 739. When pages 340 are being generated for a particular news channel 739, query object 344' can retrieve all of the article objects 342 associated with that particular news channel 739. As discussed herein, cached pages 340 dependent on page templates containing query object 344' can become stale when new article objects 342 are added to the particular current channel 739. Such cached pages 340 can also become stale should particular article objects 342 be deleted from the particular current channel 739. Cached pages 340 can also become stale, as discussed above, should attributes of particular article objects 342 and 344 be modified.

System 300 of FIG. 10 can include features to detect object 342 and 344 creations, object 342 and 344 deletions, and object 342 and 344 attribute modifications; determine which pages 340 might be affected thereby; and invalidate and (when desired) regenerate those affected pages 340. More particularly, and with reference now to FIG. 13 dependency table 700 in dependency database 318 can include contextual dependencies 732, 734, 736, and 738 associated with page identifier 702, respectively, RXCVBNNMJKLFGHWDBHYK, STYUSFUHRFVYIMERFTHY, SZHJUYDFGYHJJIHJJKKY, and VJLKJLRADHYIKVXCFSRD. Contextual dependencies 732 and 734 can indicate that pages 340 associated with page identifiers 702 RXCVBNNMJKLFGHWDBHYK and STYUSFUHRFVYIMERFTHY depend on sets of objects 342 and 344 associated with, respectively, channels ABC and DEF (see FIG. 11). Contextual dependencies 736 and 738 can indicate that pages 340 associated with page identifier 702 SZHJUYDFGYHJJIHJJKKY and VJLKJLRADHYIKVXCFSRD depend on, respectively, creation of objects 342 and 344 of type A and deletion of objects 342 and 344 of type B.

Contextual dependencies (such as contextual dependencies 732, 734, 736, and 738 of FIG. 13) can be specified as follows:

{target|specifier|filter|event} where "targets" and "specifiers" together can identify sets of objects 342 and 344. Targets can identify particular objects 342 and 344, although in some circumstances the target for particular contextual dependencies (such as contextual dependencies 732, 734, 736, and 738) can be empty. Specifiers can identify sets of objects 342 and 344 related to targets. For query object 344' of FIG. 11, a particular target can be the current channel 739 when query object 344' is executed, and a particular specifier can be "ChanContent", which can indicate the set of all objects 342 and 344 associated with the current channel 739.

"Filters" can be qualifiers that can limit the sets of objects 342 and 344 identified by targets and specifiers. For query object 344', a particular filter can be the name of the Article object type, indicating that this particular contextual dependency can apply only to article objects 342 which are associated with the current channel 739. Filters can be restrictive (as in the foregoing) or empty. In some embodiments, filters can apply to object 342 and 344 attributes and other features associated with objects 342 and 344, channels 339, etc. Filters can be chosen to balance expressiveness (and precision in the sets of returned objects 342 and 344) and the amount of processing resources potentially utilized by invalidation generator 314 in applying filters. "Events" indicate whether contextual dependencies apply to object 342 and 344 creations, object 342 and 344 deletions, object 342 and 344 and object 342 and 344 attribute modifications, etc.

When the query object 344' is executed in the context of channel "DEF" (see FIG. 11), the following contextual dependencies 732 and 734 can be created (among other contextual dependencies 732 and 734 and dependencies 701 and 703) for pages 340 which depend on query object 344':

{ABC|ChannelContent( )|Article|E}

{DEF|ChannelContent( )|Article.moAttrs|M} where "E" can indicate an event which affected the existence of various article objects 342 occurred (a particular object 342 and 344 was created or deleted) and "M" can indicate an event which modified objects 342 or object attributes occurred.

The first of these particular contextual dependencies 732 can indicate that certain cached pages 340 can be invalidated whenever an article object 342 (which is associated with channel "ABC") is created or deleted. Invalidation may be desirable for these cached pages 340 because query object 344' might produce different results whenever article objects 342 associated with channel ABC are created or deleted. However, pages 340 affected by this first particular contextual dependency 732 might not be invalidated if objects 342 and 344 of some type other than article are created or deleted because this particular contextual dependency 732 restricts itself to article objects 342. Thus, when dependency manager 316 determines whether contextual invalidation events apply to pages 340 affected by this particular contextual dependency 732, processing resources may be saved by only comparing contextual invalidation events which apply to objects 342 of type article to this particular contextual dependency. Filters such as the foregoing article filter can also avoid unnecessary page 340 invalidations by limiting the scope of contextual dependencies such as contextual dependency 732.

The second of these particular contextual dependencies 734 can indicate that pages 340 can be invalidated whenever article objects 342 associated with channel DEF are modified, but only if the modification involves only attributes in the "moAttrs" attribute set. In one embodiment, the moAttrs attribute set can be a set of standard attributes shared by all objects 342 and 344 and can include such attributes as a "System Name" attribute. Thus, when an object 342 and 344 associated with channel DEF is modified, but the modification fails to involve an attribute in the moAttrs set, corresponding pages 340 will not be invalidated. However, corresponding pages 340 might have other direct dependencies 701 and 703 for some of objects 342 and 344 retrieved by query object 344'. Accordingly, some corresponding pages 340 might be affected by these other dependencies 701 and 703.

As discussed above, query object 344' can result in the two foregoing contextual dependencies 732 and 734. Other dependencies 701 and 703 might be created for pages 340 which depend on query object 344' because, for instance, query object 344' inserts objects 342 into these pages 340. These inserted objects 342 might therefore give rise to dependencies 701 and 703. For other, more complex query objects 344', more contextual dependencies and dependencies 701 and 703 might be created depending on, respectively, the complexity of query objects 344' and the particular objects 342 returned thereby.

Thus, as illustrated by FIG. 10, invalidation generator 314 can detect object 342 and 344 creations, deletions, and modifications to generate contextual dependencies (such as contextual dependencies 732, 734, 736, and 738). Contextual invalidation events can indicate which sets of objects 342 and 344 might have had their memberships modified and which member objects 342 and 344 might have had their attributes modified. Invalidation generator 314 can send contextual invalidation events as contextual dependencies (such as contextual dependencies 732, 734, 736, and 738) to dependency manager 316.

Dependency manager 316 can receive contextual dependencies and contextual invalidation events from invalidation generator 314. Contextual dependencies (such as contextual dependencies 732, 734, 736, and 738) can be stored in dependency database 318 by dependency manager 316. When dependency manager 316 receives contextual invalidation events, dependency manager 316 can compare contextual invalidation events to contextual dependencies in dependency database 318 to determine which cached pages 340 might be affected by the contextual invalidation events. When cached pages 340 are affected by contextual invalidation events, dependency manager 316 can issue corresponding page invalidation notifications 359 to cache manager 312.

System 300 can operate to invalidate and (when desired) regenerate pages 340 in content cache 310. System 300 can operate to prevent overlapping modifications (whether event driven or contextual) from causing invalidated pages 340 to remain in, or re-appear in, content cache 310. System 300 can, in some embodiments, generate both event driven page 340 invalidations and contextual event driven page 340 invalidations and regenerate affected pages 340 accordingly.

Embodiments provide systems and methods for regenerating cached World Wide Web pages, thereby reducing the amount of stale data in the cache. When stale data happens to be in the cache, embodiments reduce the time during which such stale data resides in the cache. Embodiments reduce, if not eliminate, the likelihood that overlapping invalidation events can allow invalidated pages to remain in the cache. Embodiments provide systems and methods in which pages can be invalidated based on events which can pertain to the validity of the pages. In some embodiments, invalidated pages can be regenerated when such invalidation events occur. Embodiments also allow invalidated pages to be discarded when events occur which give rise to their invalidation. Some embodiments reduce, if not eliminate, page regenerations (and the associated processing and network overhead) associated with time-to-live approaches to reducing stale pages in caches.

Embodiments provide methods and systems which allow pages to be invalidated based on changes in membership of sets of objects underlying the pages. Embodiments allow pages which depend on query objects to be updated when objects which should be returned by the query are created, deleted, or modified in such a manner that attributes associated with the objects are modified. Various embodiments provide content of higher quality to end users than previously possible. Various embodiments provide higher quality content delivery for content management systems than previously possible. Embodiments save space in and processing resources associated with content caches.

Although embodiments have been described in detail herein, it should be understood that the description is by way of example only and is not to be construed in a limiting sense.

It is to be further understood, therefore, that numerous changes in the details of the embodiments and additional embodiments will be apparent, and may be made by, persons of ordinary skill in the art having reference to this description. It is contemplated that all such changes and additional embodiments are within scope of the claims below and their legal equivalents.

What is claimed is:

1. A system comprising:
a processor; and
computer readable storage medium storing instructions which when executed by a processor cause the processor to:
detect a content change in a content database accessible by a content manager, the content manager being communicatively connected to an invalidation generator, wherein the content change comprises a modification to at least one set of zero or more objects stored in the content database;
cause the invalidation generator to generate one or more invalidations based on the modification to the at least one set of zero or more objects stored in the content database;
communicate the one or more invalidations to a dependency manager, wherein the dependency manager and the content manager reside on one or more computers in a network environment;
generate one or more page invalidation notices to notify a cache manager that one or more pages stored in a page cache managed by the cache manger have been invalidated based on a dependency or dependencies to the at least one set of zero or more objects whose modification has been detected, wherein the one or more page invalidation notices are generated by the dependency manager, the dependency manager being communicatively connected to the cache manager; and
forward the one or more page invalidation notices from the dependency manager to the cache manager.

2. The system of claim 1, wherein the instructions further cause the processor to determine whether a cached page stored in the page cache is affected by the modification to the at least one set of zero or more objects stored in the content database.

3. The system of claim 1, wherein the instructions further cause the processor to regenerate a cached page.

4. The system of claim 3, wherein the instructions further cause the processor to discover one or more dependencies during the regeneration of the cached page.

5. A method for invalidating cached pages, comprising:
at a computer implementing an invalidation generator, detecting a content change in a content database accessible by a content manager, the content manager being communicatively connected to the invalidation generator, wherein the content change comprises a modification to at least one set of zero or more objects stored in the content database;
in response to the modification to the at least one set of zero or more objects, causing the invalidation generator to generate one or more invalidations based on the modification to the at least one set of zero or more objects stored in the content database;
communicating the one or more invalidations to a dependency manager, wherein the dependency manager and the content manager reside on one or more computers in a network environment;
generating one or more page invalidation notices to notify a cache manager that one or more pages stored in a page cache managed by the cache manager have been invalidated based on a dependency or dependencies to the at least one set of zero or more objects whose modification has been detected, wherein the generating is performed by the dependency manager; and
forwarding the one or more page invalidation notices to the cache manager.

6. The method of claim 5 further comprises determining whether a cached page stored in the page cache is affected by the modification to the at least one set of zero or more objects stored in the content database.

7. The method of claim 6, wherein the cached page is dependent upon at least one set of zero or more objects.

8. The method of claim 5, wherein the at least one set of zero or more objects is defined by an object attribute.

9. The method of claim 5 further comprising regenerating a cached page.

10. The method of claim 9 further comprising discovering one or more dependencies during the regeneration of the cached page.

11. The method of claim 5 wherein the modification to the at least one set of zero or more objects includes creation of an object in the set of zero or more objects.

12. The method of claim 5 wherein the modification to the at least one set of zero or more objects includes deletion of an object from the at least one set of zero or more objects.

13. A non-transitory computer readable storage medium storing instructions which when executed by a processor cause the processor to:
detect a content change in a content database accessible by a content manager, the content manager being communicatively connected to an invalidation generator, wherein the content change comprises a modification to at least one set of zero or more objects stored in the content database;
cause the invalidation generator to generate one or more invalidations based on the modification to the at least one set of zero or more objects stored in the content database;
communicate the one or more invalidations to a dependency manager, wherein the dependency manager and the content manager reside on one or more computers in a network environment;
generate one or more page invalidation notices to notify a cache manager that one or more pages stored in a page cache managed by the cache manager have been invalidated based on a dependency or dependencies to the at least one set of zero or more objects whose modification has been detected, wherein the one or more page invalidation notices are generated by the dependency manager, the dependency manager being communicatively connected to the cache manager; and
forward the one or more page invalidation notices from the dependency manager to the cache manager.

14. The computer readable storage medium of claim 13 wherein the instructions further cause the processor to determine whether a cached page stored in the page cache is affected by the modification to the at least one set of zero or more objects stored in the content database.

15. The computer readable storage medium of claim 14, wherein the cached page is dependent upon at least one set of zero or more objects.

16. The computer readable storage medium of claim 13 wherein the at least one set of zero or more objects is defined by an object attribute.

17. The computer readable storage medium of claim 13 wherein the instructions further cause the processor to regenerate a cached page.

18. The computer readable storage medium of claim 17 wherein the instructions further cause the processor to discover one or more dependencies during the regeneration of the cached page.

19. The computer readable storage medium of claim 13 wherein the modification to the at least one set of zero or more objects includes creation of an object in the at least one set of zero or more objects.

20. The computer readable storage medium of claim 13 wherein the modification to the at least one set of zero or more objects includes deletion of an object from the at least one set of zero or more objects.

* * * * *